(12) United States Patent
Hirakata et al.

(10) Patent No.: US 11,983,793 B2
(45) Date of Patent: May 14, 2024

(54) FOLDABLE DISPLAY DEVICE INCLUDING A PLURALITY OF REGIONS

(71) Applicant: Semiconductor Energy Laboratory Co., Ltd., Atsugi (JP)

(72) Inventors: Yoshiharu Hirakata, Ebina (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/960,984

(22) Filed: Oct. 6, 2022

(65) Prior Publication Data

US 2023/0032671 A1 Feb. 2, 2023

Related U.S. Application Data

(63) Continuation of application No. 16/450,049, filed on Jun. 24, 2019, now Pat. No. 11,475,532, which is a continuation of application No. 14/553,288, filed on Nov. 25, 2014, now abandoned.

(30) Foreign Application Priority Data

Dec. 2, 2013 (JP) .................................. 2013-249677

(51) Int. Cl.
G06T 1/20 (2006.01)
(52) U.S. Cl.
CPC ...................................... *G06T 1/20* (2013.01)
(58) Field of Classification Search
None
See application file for complete search history.

(56) References Cited

U.S. PATENT DOCUMENTS

| | | | |
|---|---|---|---|
| 6,243,074 B1 | 6/2001 | Fishkin et al. |
| 6,243,075 B1 | 6/2001 | Fishkin et al. |
| 6,268,857 B1 | 7/2001 | Fishkin et al. |
| 6,297,805 B1 | 10/2001 | Adler et al. |
| 6,297,838 B1 | 10/2001 | Chang et al. |

(Continued)

FOREIGN PATENT DOCUMENTS

| | | |
|---|---|---|
| CN | 103294113 A | 9/2013 |
| CN | 103399684 A | 11/2013 |

(Continued)

*Primary Examiner* — Patrick F Valdez
(74) *Attorney, Agent, or Firm* — Eric J. Robinson; Robinson Intellectual Property Law Office, P.C.

(57) ABSTRACT

A novel human interface with excellent operability is provided. A novel data processing device with excellent operability is provided. A novel data processing device, a novel display device, or the like is provided. An input and output device is supplied with image data and supplies sensing data, and an arithmetic device supplies the image data and is supplied with the sensing data. The input and output device includes a plurality of display portions that display display data and a sensing portion that senses an object obscuring one of the display portions, and includes one region provided with the one of the display portions and the sensing portion, another region provided with the other display portions, and a curved portion between the one region and the other region. The arithmetic device includes an arithmetic portion and a memory portion that stores a program to be executed by the arithmetic portion.

4 Claims, 15 Drawing Sheets

(56) References Cited

U.S. PATENT DOCUMENTS

| | | |
|---|---|---|
| 6,340,957 B1 | 1/2002 | Adler et al. |
| 6,577,496 B1 | 6/2003 | Gioscia et al. |
| 6,630,922 B2 | 10/2003 | Fishkin et al. |
| 7,082,578 B1 | 7/2006 | Fishkin et al. |
| 7,813,761 B2 | 10/2010 | Minami |
| 7,969,382 B2 | 6/2011 | Kim et al. |
| 8,319,725 B2 | 11/2012 | Okamoto et al. |
| 8,415,208 B2 | 4/2013 | Takayama et al. |
| 8,516,728 B2 | 8/2013 | Jung |
| 8,610,118 B2 | 12/2013 | Yamazaki et al. |
| 8,610,155 B2 | 12/2013 | Hatano et al. |
| 8,736,162 B2 | 5/2014 | Jin et al. |
| 8,760,364 B2 | 6/2014 | Kim et al. |
| 8,810,508 B2 | 8/2014 | Okamoto et al. |
| 9,024,863 B2 | 5/2015 | Okamoto et al. |
| 9,107,287 B2 | 8/2015 | Ryu |
| D745,004 S | 12/2015 | Kim |
| 9,300,772 B2 | 3/2016 | Kim |
| 9,397,117 B2 | 7/2016 | Okamoto et al. |
| 9,438,709 B2 | 9/2016 | Kim |
| 9,448,592 B2 | 9/2016 | Jin et al. |
| D770,504 S | 11/2016 | Kim et al. |
| 9,491,272 B2 | 11/2016 | Kim |
| D775,124 S | 12/2016 | Kim |
| D775,625 S | 1/2017 | Kim |
| 9,602,644 B2 | 3/2017 | Kim |
| 9,980,389 B2 | 5/2018 | Okamoto et al. |
| 10,019,052 B2 | 7/2018 | Lee et al. |
| 10,042,393 B2 | 8/2018 | Ryu |
| 10,054,988 B2 | 8/2018 | Jin et al. |
| 10,178,208 B2 | 1/2019 | Kim |
| 10,244,091 B2 | 3/2019 | Kim |
| 10,528,084 B2 | 1/2020 | Jin et al. |
| 10,580,796 B2 | 3/2020 | Okamoto et al. |
| 10,983,564 B2 | 4/2021 | Jin et al. |
| 11,215,858 B2 | 1/2022 | Okamoto et al. |
| 11,598,982 B2 | 3/2023 | Okamoto et al. |
| 2001/0011029 A1 | 8/2001 | Iwabuchi et al. |
| 2003/0201974 A1 | 10/2003 | Yin |
| 2004/0135738 A1 | 7/2004 | Kim et al. |
| 2005/0253773 A1* | 11/2005 | Sekiguchi ............. G06F 3/1423 345/1.1 |
| 2006/0050169 A1 | 3/2006 | Misawa |
| 2009/0021666 A1 | 1/2009 | Chen |
| 2009/0196066 A1 | 8/2009 | Masuda et al. |
| 2010/0117975 A1 | 5/2010 | Cho |
| 2010/0308335 A1 | 12/2010 | Kim et al. |
| 2010/0317407 A1 | 12/2010 | Ferren |
| 2010/0317409 A1 | 12/2010 | Jiang et al. |
| 2011/0007042 A1 | 1/2011 | Miyaguchi |
| 2011/0050657 A1 | 3/2011 | Yamada |
| 2012/0050135 A1 | 3/2012 | Glen et al. |
| 2012/0057280 A1 | 3/2012 | Hoshino |
| 2012/0212430 A1 | 8/2012 | Jung et al. |
| 2012/0217516 A1 | 8/2012 | Hatano et al. |
| 2012/0236484 A1 | 9/2012 | Miyake |
| 2012/0256896 A1 | 10/2012 | Yamazaki et al. |
| 2013/0002133 A1 | 1/2013 | Jin et al. |
| 2013/0002583 A1 | 1/2013 | Jin et al. |
| 2013/0010405 A1* | 1/2013 | Rothkopf ............. H05K 5/0226 361/679.01 |
| 2013/0076649 A1 | 3/2013 | Myers et al. |
| 2013/0080762 A1 | 3/2013 | Cretella, Jr. et al. |
| 2013/0083496 A1 | 4/2013 | Franklin et al. |
| 2013/0135182 A1 | 5/2013 | Jung et al. |
| 2013/0178248 A1 | 7/2013 | Kim |
| 2013/0180882 A1 | 7/2013 | Hamers et al. |
| 2013/0194761 A1 | 8/2013 | Kim |
| 2013/0222354 A1 | 8/2013 | Koivunen |
| 2013/0300697 A1 | 11/2013 | Kim et al. |
| 2013/0314611 A1 | 11/2013 | Okutsu et al. |
| 2014/0099999 A1 | 4/2014 | Hatano et al. |
| 2014/0132481 A1 | 5/2014 | Bell et al. |
| 2014/0183342 A1 | 7/2014 | Shedletsky et al. |
| 2014/0306260 A1 | 10/2014 | Yamazaki et al. |
| 2014/0319550 A1 | 10/2014 | Yamazaki et al. |
| 2014/0333542 A1 | 11/2014 | Barreca |
| 2015/0103023 A1 | 4/2015 | Iwaki |
| 2015/0138072 A1 | 5/2015 | Yamazaki et al. |
| 2015/0205560 A1 | 7/2015 | Zhao |
| 2015/0242006 A1 | 8/2015 | Kim et al. |
| 2016/0294995 A1 | 10/2016 | Kim |
| 2016/0373565 A1 | 12/2016 | Kim |
| 2018/0267642 A1 | 9/2018 | Kim et al. |
| 2019/0191022 A1 | 6/2019 | Kim |
| 2021/0240228 A1 | 8/2021 | Jin et al. |

FOREIGN PATENT DOCUMENTS

| | | |
|---|---|---|
| EP | 0899650 A | 3/1999 |
| EP | 0899651 A | 3/1999 |
| EP | 1635313 A | 3/2006 |
| EP | 2360517 A | 8/2011 |
| EP | 2648066 A | 10/2013 |
| EP | 3041147 A | 7/2016 |
| EP | 3041148 A | 7/2016 |
| EP | 3070851 A | 9/2016 |
| EP | 3223435 A | 9/2017 |
| EP | 3223436 A | 9/2017 |
| EP | 3247045 A | 11/2017 |
| EP | 3327543 A | 5/2018 |
| EP | 3512105 A | 7/2019 |
| JP | 59-007343 A | 1/1984 |
| JP | 11-134087 A | 5/1999 |
| JP | 11-143606 A | 5/1999 |
| JP | 2001-255513 A | 9/2001 |
| JP | 2001-282145 A | 10/2001 |
| JP | 2002-278466 A | 9/2002 |
| JP | 2003-174153 A | 6/2003 |
| JP | 2003-345286 A | 12/2003 |
| JP | 2005-012528 A | 1/2005 |
| JP | 2005-501283 | 1/2005 |
| JP | 2005-114759 A | 4/2005 |
| JP | 2005-191708 A | 7/2005 |
| JP | 2006-005712 A | 1/2006 |
| JP | 2006-072115 A | 3/2006 |
| JP | 2007-326259 A | 12/2007 |
| JP | 2010-153813 A | 7/2010 |
| JP | 2010-178188 A | 8/2010 |
| JP | 2010-204497 A | 9/2010 |
| JP | 2010-256660 A | 11/2010 |
| JP | 2010-282183 A | 12/2010 |
| JP | 2012-513033 | 6/2012 |
| JP | 2012-190794 A | 10/2012 |
| JP | 2013-164775 A | 8/2013 |
| JP | 2013-218696 A | 10/2013 |
| JP | 5319825 | 10/2013 |
| JP | 2015-512170 | 4/2015 |
| KR | 2013-0007311 A | 1/2013 |
| KR | 2013-0061156 A | 6/2013 |
| KR | 2013-0081617 A | 7/2013 |
| KR | 2013-0127050 A | 11/2013 |
| WO | WO-2003/019349 | 3/2003 |
| WO | WO-2010/128614 | 11/2010 |
| WO | WO-2013/103278 | 7/2013 |
| WO | WO-2013/154317 | 10/2013 |
| WO | WO-2014/204047 | 12/2014 |

* cited by examiner

FIG. 2A
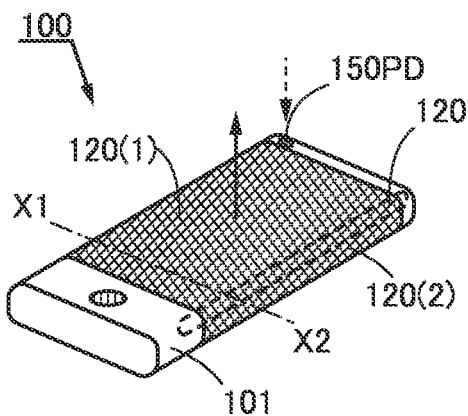
FIG. 2B
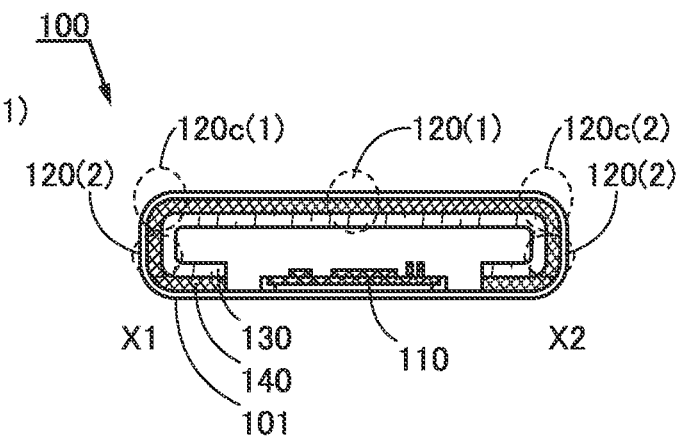
FIG. 2C1
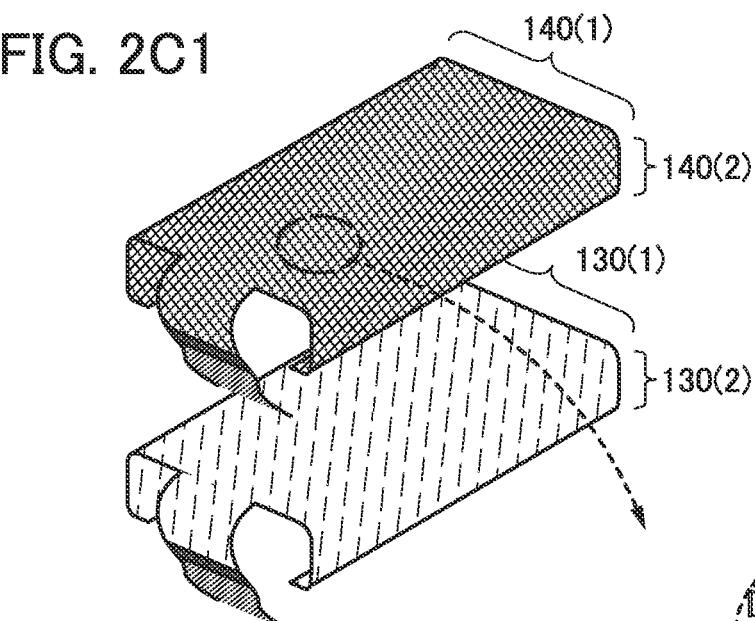
FIG. 2C2
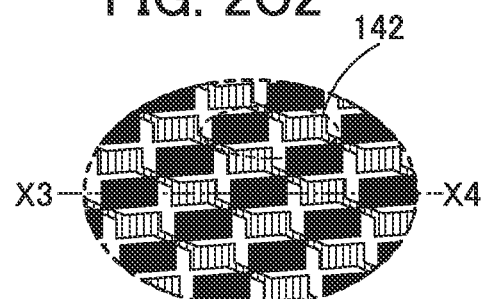
FIG. 2D
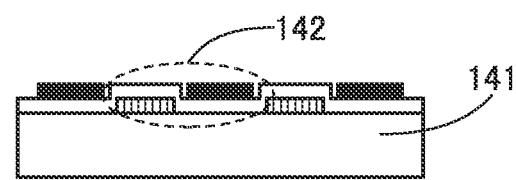

FIG. 3A1
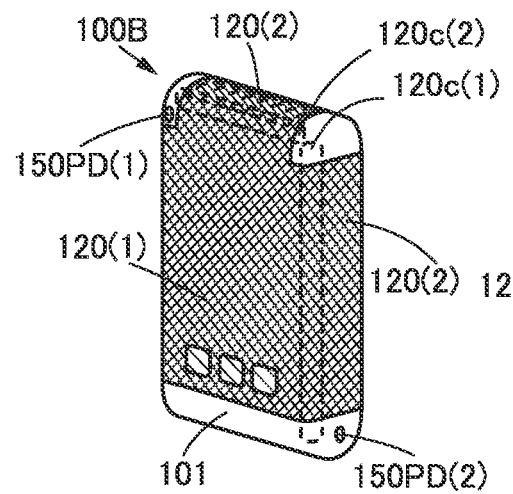
FIG. 3A2
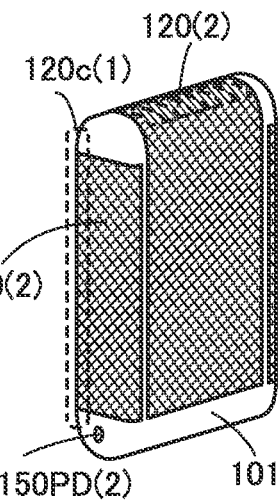
FIG. 3A3
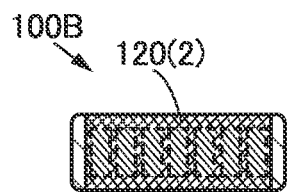
FIG. 3B
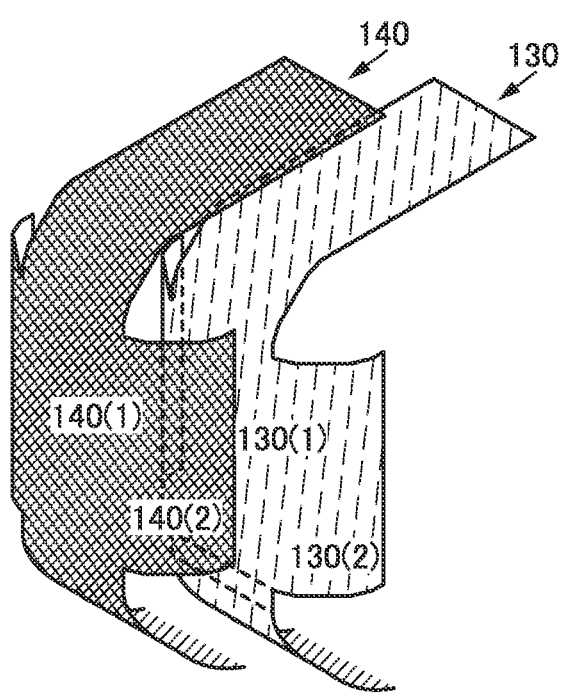
FIG. 3C
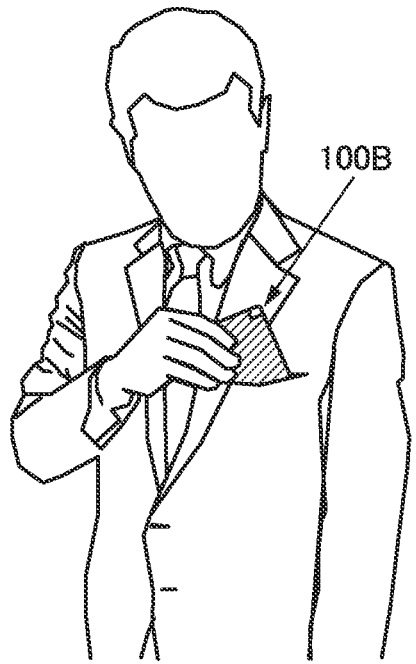

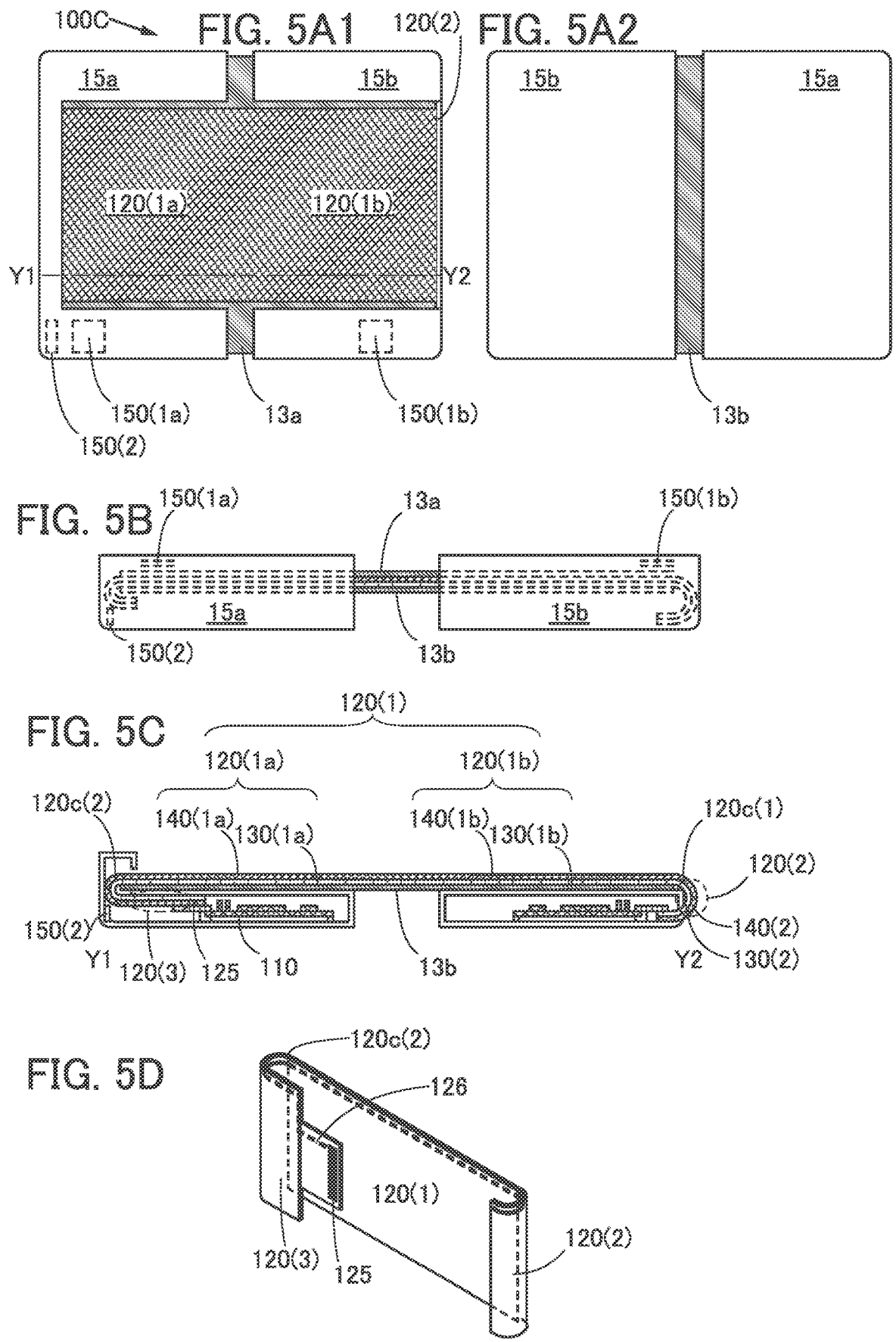

FIG. 6A1
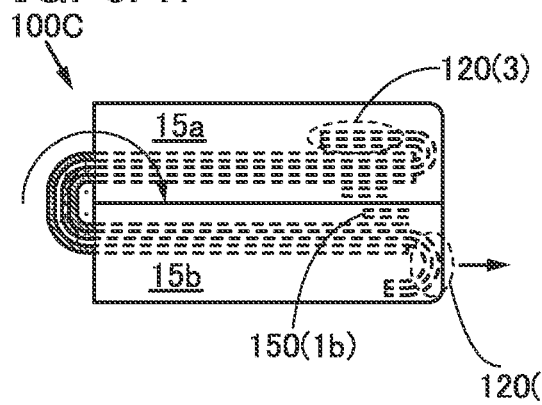
FIG. 6A2
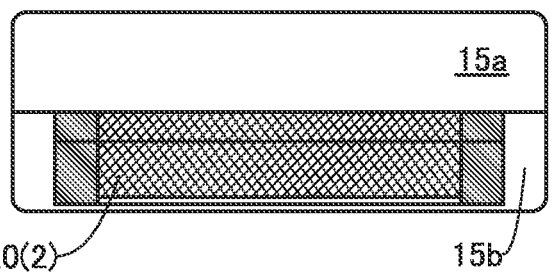
FIG. 6B1
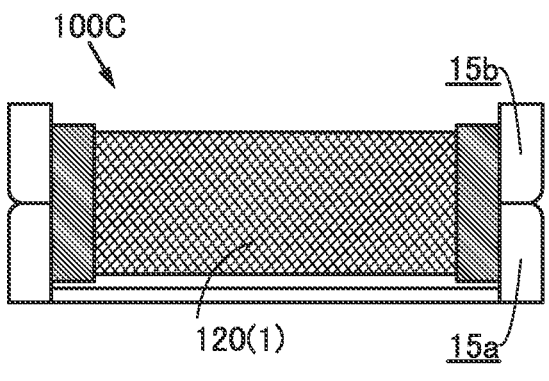
FIG. 6B2
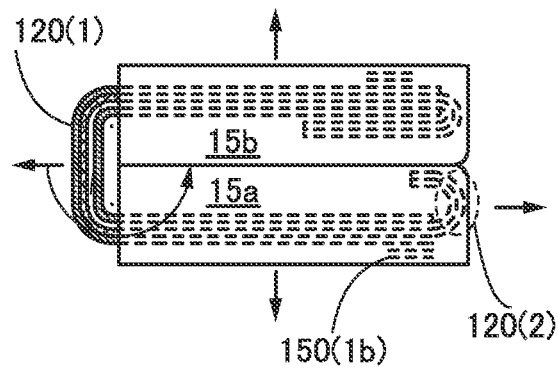

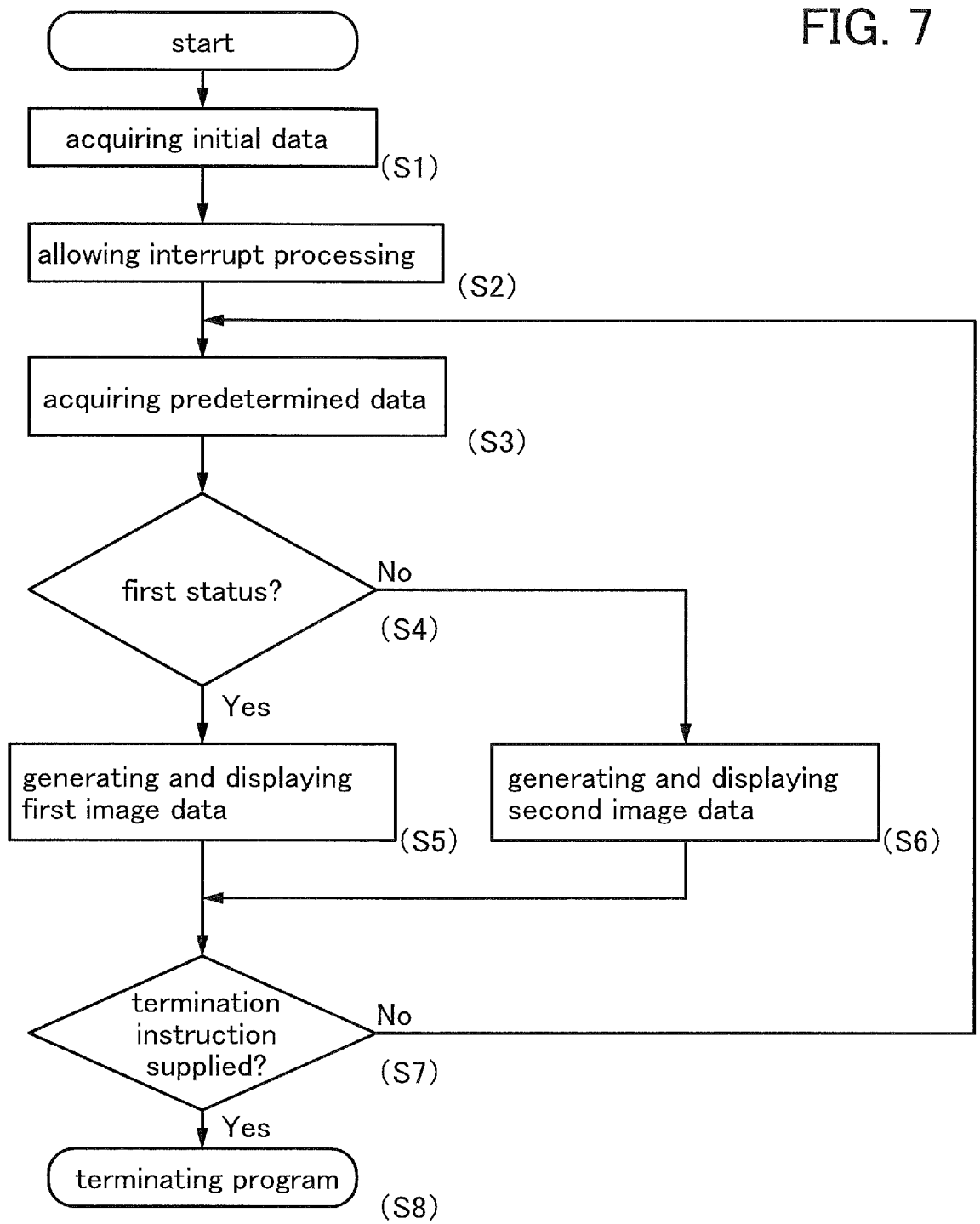

FOLDABLE DISPLAY DEVICE INCLUDING A PLURALITY OF REGIONS

BACKGROUND OF THE INVENTION

1. Field of the Invention

One embodiment of the present invention relates to a method and a program for processing and displaying image information, and a device including a storage medium in which the program is stored. In particular, one embodiment of the present invention relates to a method for processing and displaying image data by which an image including information processed by a data processing device provided with a display portion is displayed, a program for displaying an image including information processed by a data processing device provided with a display portion, and a data processing device including a storage medium in which the program is stored.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

The social infrastructures relating to means for transmitting information have advanced. This has made it possible to acquire, process, and send out many pieces and various kinds of information with the use of a data processing device not only at home or office but also at other visiting places.

With this being the situation, portable data processing devices are under active development.

Portable data processing devices are often used while being carried around, and force might be accidentally applied, by dropping for example, to the data processing devices and to display devices included in them. As an example of a display device that is not easily broken, a display device having high adhesiveness between a structure body by which a light-emitting layer is divided and a second electrode layer is known (Patent Document 1).

For example, a cellular phone is known in which a display device is provided on a front side and on an upper side in the longitudinal direction of a housing (Patent Document 2).

PATENT DOCUMENTS

[Patent Document 1] Japanese Published Patent Application No. 2012-190794
[Patent Document 2] Japanese Published Patent Application No. 2010-153813

SUMMARY OF THE INVENTION

An object of one embodiment of the present invention is to provide a novel human interface with excellent operability. Another object is to provide a novel data processing device with excellent operability. Another object is to provide a novel data processing device, a novel display device, or the like.

Note that the descriptions of these objects do not disturb the existence of other objects. Note that in one embodiment of the present invention, there is no need to achieve all the objects. Note that other objects will be apparent from and can be derived from the description of the specification, the drawings, the claims, and the like.

One embodiment of the present invention is a data processing device including an input and output device supplied with first image data and second image data and capable of supplying first sensing data, and an arithmetic device capable of supplying the first image data and the second image data and supplied with the first sensing data.

The input and output device includes a first display portion supplied with and capable of displaying the first image data, a second display portion supplied with and capable of displaying the second image data, a first sensing portion capable of sensing an object obscuring the first display portion and supplying the first sensing data, a first region provided with the first display portion, a second region provided with the second display portion, and a first curved portion between the first region and the second region.

The arithmetic device includes an arithmetic portion and a memory portion capable of storing a program to be executed by the arithmetic portion. The arithmetic portion is capable of generating the first image data or the second image data based on the first sensing data.

The above-described data processing device of one embodiment of the present invention includes the input and output device supplied with image data and capable of supplying sensing data, and the arithmetic device capable of supplying the image data and supplied with the sensing data. The input and output device includes a plurality of display portions capable of displaying display data and a sensing portion capable of sensing an object obscuring one of the plurality of display portions, and includes one region provided with the one of the plurality of display portions and the sensing portion, another region provided with the other display portions, and a curved portion between the one region and the other region. The arithmetic device includes the arithmetic portion and the memory portion capable of storing a program to be executed by the arithmetic portion. Thus, image data based on sensing data supplied from the one region can be generated and displayed on the one region and/or the other region. Consequently, a novel data processing device can be provided.

In the above-described data processing device of one embodiment of the present invention, the input and output device may include a second sensing portion capable of sensing an object obscuring the second display portion and supplying second sensing data. The arithmetic device is supplied with the second sensing data. The arithmetic portion is capable of generating the first image data and/or the second image data based on the first sensing data and/or the second sensing data.

In the above-described structure, the above-described data processing device of one embodiment of the present invention may include the second display portion, the second sensing portion capable of sensing an object obscuring the second display portion, and the second region provided with the second display portion and the second sensing portion. Thus, image data based on sensing data supplied from one of the regions can be generated and displayed by the input and output device. Consequently, a novel data processing device can be provided.

In the above-described data processing device of one embodiment of the present invention, the first region can be folded or unfolded.

The data processing device of one embodiment of the present invention includes the first region which can be folded or unfolded. Accordingly, the data processing device can be used with the first region having a highly portable size or a highly browsable size. Consequently, a novel data processing device can be provided.

Another embodiment of the present invention is a data processing device including an input and output device supplied with first image data and second image data and capable of supplying first sensing data, and an arithmetic device capable of supplying the first image data and the second image data and supplied with the first sensing data.

The input and output device includes a terminal supplied with the first image data and the second image data, a first display portion supplied with and capable of displaying the first image data, a second display portion supplied with and capable of displaying the second image data, a first sensing portion capable of sensing an object obscuring the first display portion and supplying the first sensing data, a first region provided with the first display portion, a second region provided with the second display portion, a third region provided with the terminal, a first curved portion between the first region and the second region, and a second curved portion between the first region and the third region. The third region is capable of supplying the first image data and the second image data. The first region is supplied with the first image data and the second image data and is capable of supplying the second image data. The second region is supplied with the second image data.

In the data processing device, an arithmetic portion is capable of generating the first image data or the second image data based on the first sensing data.

The above-described data processing device of one embodiment of the present invention includes the first region provided with the first display portion, the second region provided with the second display portion, the third region provided with the terminal, the first curved portion between the first region and the second region, and the second curved portion between the first region and the third region. Accordingly, the terminal is capable of supplying the first image data and the second image data. The first region is capable of displaying the first image data and supplying the second image data, and the second region is capable of displaying the second image data. Consequently, a novel data processing device can be provided.

In the above-described data processing device of one embodiment of the present invention, the input and output device may be capable of supplying first positional data and second positional data. The arithmetic device may be supplied with the first positional data and the second positional data. The input and output device may include a first positional data input portion capable of supplying the first positional data and a second positional data input portion capable of supplying the second positional data. The first region may include the first positional data input portion overlapping with the first display portion. The second region may include the second positional data input portion overlapping with the second display portion.

In the above-described data processing device of one embodiment of the present invention, the first region includes the first positional data input portion overlapping with the first display portion, and the second region includes the second positional data input portion overlapping with the second display portion. Accordingly, image data based on positional data supplied from one data input portion can be generated and displayed on the first display portion or the second display portion. Consequently, a novel data processing device can be provided.

Another embodiment of the present invention is the above-described data processing device with a program including a first step of acquiring initial data including status data; a second step of allowing an interrupt processing; a third step of acquiring predetermined data; a fourth step of selecting a fifth step when the status data shows a first status or a sixth step when the status data shows a second status; the fifth step of generating first image data based on the predetermined data and displaying the first image data on the first display portion; the sixth step of generating second image data based on the predetermined data and displaying the second image data on the second display portion; a seventh step of selecting an eighth step when a termination instruction is supplied in the interrupt processing or the third step when no termination instruction is supplied in the interrupt processing; and the eighth step of terminating the program.

The interrupt processing includes a ninth step of acquiring first sensing data and second sensing data; a tenth step of determining candidate data based on the first sensing data and the second sensing data; an eleventh step of selecting a twelfth step when the candidate data differs from the status data or the ninth step when the candidate data is the same as the status data; the twelfth step of updating the status data with the candidate data; and a thirteenth step of returning from the interrupt processing.

In the above-described data processing device of one embodiment of the present invention, the program includes the step of determining candidate data by acquiring the first sensing data and the second sensing data; the step of updating the status data with the candidate data when the status data differs from the candidate data; and the step of generating and displaying image data including predetermined data based on the updated status data. Thus, an image including the predetermined data which is based on the status data can be generated and displayed on a predetermined region. Consequently, a novel data processing device can be provided.

According to one embodiment of the present invention, a novel human interface with excellent operability can be provided. A novel data processing device with excellent operability can be provided. A novel data processing device, a novel display device, or the like can be provided. Note that the description of these effects does not disturb the existence of other effects. One embodiment of the present invention does not necessarily achieve all the above effects. Other effects will be apparent from and can be derived from the description of the specification, the drawings, the claims, and the like.

BRIEF DESCRIPTION OF THE DRAWINGS

FIGS. 2A, 2B, 2C1, 2C2, and 2D are schematic diagrams illustrating a structure of a data processing device of an embodiment.

FIGS. 3A1, 3A2, 3A3, 3B, and 3C are schematic diagrams illustrating a structure of a data processing device of an embodiment.

FIGS. 5A1, 5A2, 5B, 5C, and 5D are schematic diagrams illustrating a structure of a data processing device of an embodiment.

FIGS. 6A1, 6A2, 6B1, and 6B2 are schematic diagrams illustrating a structure of a data processing device of an embodiment.

FIG. 7 is a flowchart illustrating a program stored in a memory portion of a data processing device of an embodiment.

DETAILED DESCRIPTION OF THE INVENTION

Figure 1:
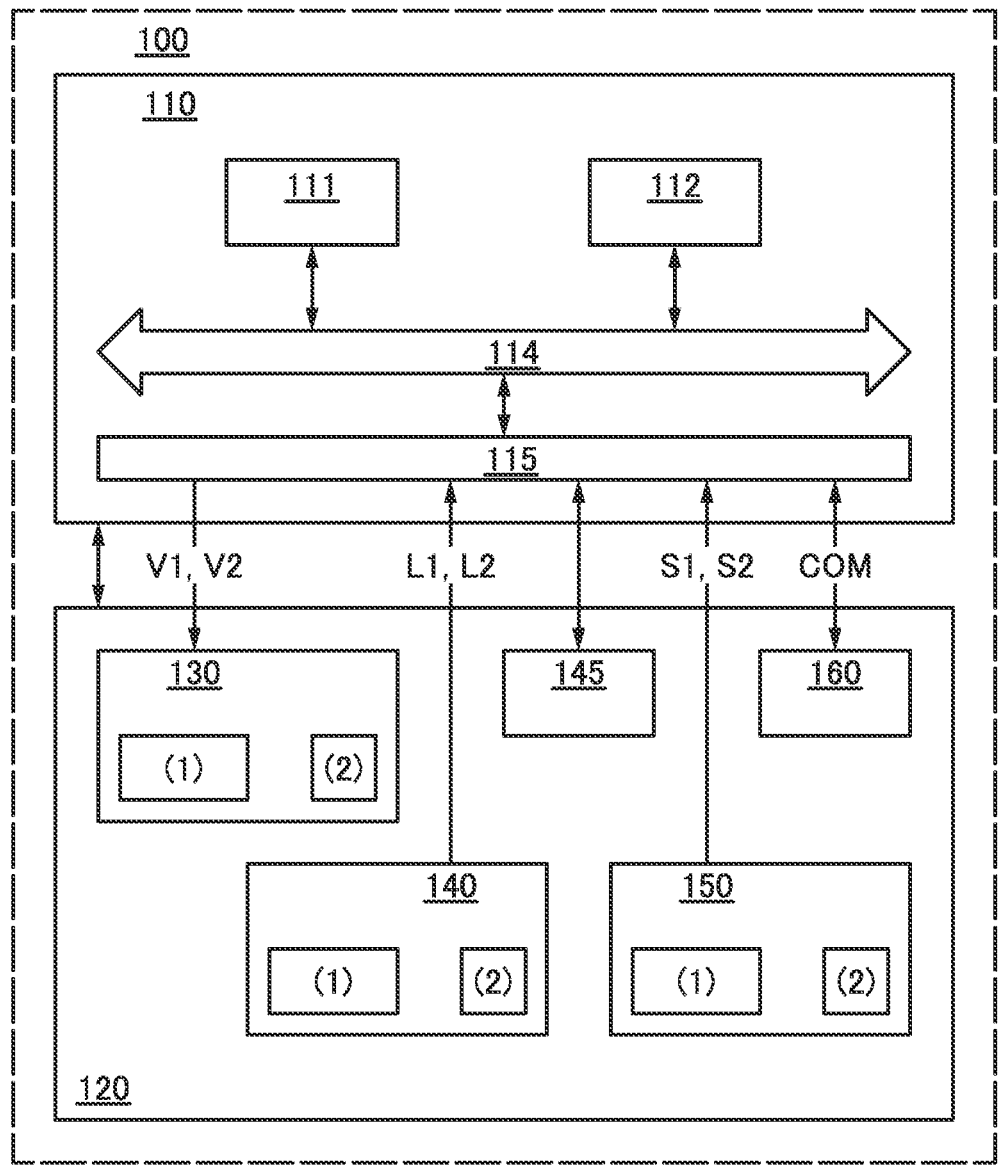
FIG. 1 is a block diagram illustrating a structure of a data processing device of an embodiment.

A data processing device of one embodiment of the present invention includes an input and output device supplied with image data and capable of supplying sensing data, and an arithmetic device capable of supplying the image data and supplied with the sensing data. The input and output device includes a plurality of display portions capable of displaying display data and a sensing portion capable of sensing an object obscuring one of the plurality of display portions, and includes one region provided with the one of the display portions and the sensing portion, another region provided with the other display portions, and a curved portion between the one region and the other region. The arithmetic device includes an arithmetic portion and a memory portion capable of storing a program to be executed by the arithmetic portion.

Thus, image data based on sensing data supplied from a first region can be generated and displayed on the first region and/or a second region. As a result, a novel human interface with excellent operability can be provided. A novel data processing device with excellent operability can be provided. A novel data processing device, a novel display device, or the like can be provided.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

EMBODIMENT 1

In this embodiment, a structure of a data processing device of one embodiment of the present invention will be described with reference to FIG. 1 and FIGS. 2A, 2B, 2C1, 2C2, and 2D.

FIG. 1 is a block diagram illustrating a structure of a data processing device 100 of one embodiment of the present invention.

FIG. 2A is a schematic diagram illustrating the appearance of the data processing device 100 of one embodiment of the present invention, and FIG. 2B is a cross-sectional view illustrating a cross-sectional structure along a cutting-plane line X1-X2 in FIG. 2A.

FIG. 2C1 is a schematic diagram illustrating the appearance of a positional data input portion and a display portion which can be used in the data processing device 100.

FIG. 2C2 is a schematic diagram illustrating the appearance of a proximity sensor 142 which can be used in the positional data input portion.

FIG. 2D is a cross-sectional view illustrating a cross-sectional structure of the proximity sensor 142 along a cutting-plane line X3-X4 in FIG. 2C2.

EXAMPLE 1 OF STRUCTURE OF DATA PROCESSING DEVICE

The data processing device 100 described in this embodiment includes an input and output device 120 that is supplied with first image data V1 and second image data V2 and supplies first sensing data S1, and an arithmetic device 110 that supplies the first image data V1 and the second image data V2 and is supplied with the first sensing data S1 (see FIG. 1).

The input and output device 120 includes a first display portion 130(1) that is supplied with and displays the first image data V1, a second display portion 130(2) that is supplied with and displays the second image data V2, and a first sensing portion 150(1) that senses an object obscuring the first display portion 130(1) and supplies the first sensing data S1. The input and output device 120 also includes a first region 120(1) provided with the first display portion 130(1) and the first sensing portion 150(1), a second region 120(2) provided with the second display portion 130(2), and a first curved portion 120c(1) between the first region 120(1) and the second region 120(2) (see FIG. 1 and FIGS. 2A and 2B).

The arithmetic device 110 includes an arithmetic portion 111 and a memory portion 112 that stores a program to be executed by the arithmetic portion 111. The arithmetic portion 111 generates the first image data V1 or the second image data V2 based on the first sensing data S1 (see FIG. 1).

The above-described data processing device of one embodiment of the present invention includes the input and output device 120 that is supplied with image data and supplies sensing data, and the arithmetic device 110 that supplies the image data and is supplied with the sensing data. The input and output device 120 includes a plurality of display portions that display display data and a sensing portion that senses an object obscuring one of the display portions, and includes one region provided with the one of the display portions and the sensing portion, another region provided with the other display portions, and a curved portion between the one region and the other region. The arithmetic device includes an arithmetic portion and a memory portion that stores a program to be executed by the arithmetic portion. Thus, image data based on sensing data supplied from the one region can be generated and displayed on the one region and/or the other region. Consequently, a novel data processing device can be provided.

The input and output device 120 may be configured to supply first positional data L1 and second positional data L2, and the arithmetic device 110 may be configured to be supplied with the first positional data L1 and the second positional data L2 (see FIG. 1).

The input and output device 120 may include a positional data input portion 140 capable of supplying positional data. For example, the first region 120(1) may include a first positional data input portion 140(1) overlapping with the first display portion 130(1), and the second region 120(2) may include a second positional data input portion 140(2) overlapping with the second display portion 130(2).

The first positional data input portion 140(1) may be configured to supply the first positional data L1, and the second positional data input portion 140(2) may be configured to supply the second positional data L2.

The data processing device 100 described in this embodiment as an example can generate image data based on positional data supplied from the positional data input portion and display it on the first display portion or the second display portion. Consequently, a novel data processing device can be provided.

The input and output device 120 may include an input and output portion 145 that supplies and is supplied with data and a communication portion 160 that supplies and is supplied with communication data COM.

The arithmetic device 110 may include a transmission path 114 that supplies and is supplied with data, and an input and output interface 115 that supplies and is supplied with data.

Individual components included in the data processing device are described below. Note that these portions cannot be clearly distinguished and one portion also serves as another portion or includes part of another portion in some cases.

For example, a touch panel in which a display portion overlaps with a touch sensor serves as the positional data input portion 140 as well as a display portion 130.

Note that although this embodiment describes a touch sensor having a structure where the positional data input portion 140 is placed on a display surface side of the display portion 130 as an example, one embodiment of the present invention is not limited to this structure. Specifically, the display portion 130 may be placed on a sensing surface side of the positional data input portion 140, or the display portion 130 and the positional data input portion 140 may be integrated into one unit. In other words, either an on-cell touch panel or an in-cell touch panel may be employed.

<<Entire Structure>>

The data processing device 100 includes the input and output device 120 and the arithmetic device 110 (see FIG. 1).

<<Input and Output Device>>

The input and output device 120 includes the display portion 130 and a sensing portion 150. The input and output device 120 is supplied with the first image data V1 and the second image data V2 and supplies the first sensing data S1 and the second sensing data S2.

The input and output device 120 may include the positional data input portion 140, the input and output portion 145, and the communication portion 160.

The input and output device 120 includes the first region 120(1), the second region 120(2), the first curved portion 120c(1), and a second curved portion 120c(2) (see FIGS. 2A and 2B).

<<Curved Portion>>

A portion showing the most significant change in curvature between the first region 120(1) and the second region 120(2) is referred to as the first curved portion 120c(1). In the case where the input and output device 120 has a curved surface that includes the first region 120(1) and the second region 120(2), and the first region 120(1) and the second region 120(2) are continuous, for example, the first curved portion 120c(1) includes a portion with the smallest curvature radius that appears in a section of the curved surface. The curvature radius of the curved portion is 10 mm or less, preferably 8 mm or less, further preferably 5 mm or less, particularly preferably 4 mm or less.

The first curved portion 120c(1) and/or the second curved portion 120c(2) may have a display portion and a positional data input portion that overlaps with the display portion. With such a structure, positional data supplied from the first curved portion 120c(1) and/or the second curved portion 120c(2) may be used instead of the second positional data L2.

<<First Region>>

The first region 120(1) includes the first display portion 130(1) and the first sensing portion 150(1).

The first region 120(1) may include the first positional data input portion 140(1).

<<Second Region>>

The second region 120(2) includes the second display portion 130(2).

The second region 120(2) may also include the second positional data input portion 140(2) and/or a second sensing portion 150(2) that senses an object obscuring the second region.

Although the example in which the input and output device 120 has two second regions 120(2) is shown in FIG. 2B, one embodiment of the present invention is not limited to this example. The input and output device 120 may have only one second region 120(2), or three or more second regions 120(2).

For example, two second regions 120(2) may be arranged to face each other (see FIG. 2B). The distance between the two second regions 120(2) is, for example, 17 cm or shorter, preferably 9 cm or shorter, further preferably 7 cm or shorter. When the distance is short, the thumb of the holding hand can be used to obtain positional data in a large area of the first positional data input portion 140(1).

<<Display Portion>>

There is no particular limitation on the display portion 130 as long as the display portion 130 can display supplied image data (see FIG. 2C1).

The display portion 130 includes the first display portion 130(1) and the second display portion 130(2).

The first display portion 130(1) displays the first image data V1 that is supplied thereto, and the second display portion 130(2) displays the second image data V2 that is supplied thereto.

The first display portion 130(1) and the second display portion 130(2) may be driven as one display portion. For example, one driver circuit may supply signals to select scan lines.

The first display portion 130(1) and the second display portion 130(2) may be driven as different display portions. For example, separate driver circuits may be provided for the display portions, and the driver circuits may supply signals to select scan lines to the corresponding display portions.

For example, when the data processing device 100 is in a standby state, only the second display portion 130(2) may be driven, and drive of the first display portion 130(1) may be stopped. Stopping drive of the first display portion 130(1) can reduce power consumption.

Note that a flexible display portion which can be bent at a position overlapping with the first curved portion 120*c*(1) can be used as the display portion 130. Specific examples of structures that can be employed in the display portion 130 are described in Embodiments 4 to 6.

<<Sensing Portion>>

The sensing portion 150 senses the states of the data processing device 100 and the circumstances and supplies sensing data (see FIG. 1).

The sensing portion 150 includes the first sensing portion 150(1), and the first sensing portion senses an object obscuring the first display portion 130(1). Then, the first sensing portion 150(1) supplies the first sensing data S1 including data about whether the first display portion 130(1) is obscured or not.

For example, any of a variety of sensing elements such as a photoelectric conversion element, an imaging element, a magnetic sensor, and a proximity sensor can be used in the first sensing portion 150(1).

Specifically, a photoelectric conversion element 150PD is provided in the first region 120(1) so as to sense the intensity of light incident from a side where the first display portion 130(1) displays image data (see FIG. 2A).

This enables the photoelectric conversion element 150PD to sense that the first region is covered with a protective case or cover for the data processing device 100, clothes, or the like.

Note that the first sensing portion 150(1) is not necessarily provided in the first region 120(1) and may be provided in another place as long as the first sensing portion 150(1) can sense an object obscuring the first display portion 130(1). For example, the first sensing portion 150(1) may be provided in the second region, or data supplied from another device may be used as the first sensing data S1.

Specifically, a sensing element capable of sensing a much wider range with use of a fish-eye lens may be provided in the second region and used as the first sensing portion 150(1). Alternatively, an image taken by a monitoring camera may be obtained through a communication network and used as the first sensing data S1.

Note that the sensing portion 150 may sense acceleration, a direction, pressure, a global positioning system (GPS) signal, temperature, humidity, or the like and supply data thereon.

<<Positional Data Input Portion>>

The positional data input portion 140 senses an approaching object and supplies positional data of the approaching object to the arithmetic device 110. Note that when the positional data input portion 140 is positioned closer to the user than the display portion 130 is, the positional data input portion 140 has a light-transmitting property.

For example, the user of the data processing device 100 can give a variety of operating instructions to the data processing device 100 by making his/her finger, palm, or the like in proximity to the positional data input portion 140. For example, an operating instruction including a termination instruction (an instruction to terminate the program) can be supplied.

For example, the proximity sensors 142 may be arranged in a matrix over a flexible substrate 141 to constitute the positional data input portion 140 (see FIGS. 2C1, 2C2, and 2D).

The positional data input portion 140 includes the first positional data input portion 140(1) and the second positional data input portion 140(2).

The first positional data input portion 140(1) supplies the first positional data L1, and the second positional data input portion 140(2) supplies the second positional data L2.

The first positional data input portion 140(1) and the second positional data input portion 140(2) may be driven as one positional data input portion.

The positional data input portion 140 may be divided into the first positional data input portion 140(1) and the second positional data input portion 140(2) which are partially driven. In other words, the second positional data input portion 140(2) may be driven independently of the first positional data input portion 140(1).

Here, X1-X2 direction is set as a row direction, and the direction crossing the row direction is set as a column direction. A plurality of scan lines extending in the row direction so as to cross the first positional data input portion 140(1) and the second positional data input portion 140(2), a plurality of signal lines extending in the column direction, and the proximity sensors 142 each electrically connected to one scan line and one signal line are provided in a matrix.

The positional data input portion 140 may be partially driven in the following manner: a proximity sensor connected to a first signal line provided in the first positional data input portion 140(1) and a proximity sensor connected to a second signal line provided in the second positional data input portion 140(2) are driven independently of each other.

Specifically, when only the first positional data input portion 140(1) is used, only the proximity sensor provided in the first positional data input portion 140(1) and connected to the first signal line is driven.

Specifically, when only the second positional data input portion 140(2) is used, only the proximity sensor provided in the second positional data input portion 140(2) and connected to the second signal line is driven.

Note that the scan line is shared by the first positional data input portion 140(1) and the second positional data input portion 140(2); thus, the proximity sensor provided in the first positional data input portion 140(1) and the proximity sensor provided in the second positional data input portion 140(2) are driven at different times.

For example, in the case where the data processing device 100 is used with its housing 101 being held by the user's hand, only the first positional data input portion 140(1) may be driven and drive of the second positional data input portion 140(2) may be stopped. Stopping drive of the second positional data input portion 140(2) can reduce malfunctions due to the second positional data L2 supplied from the second positional data input portion 140(2) as a result of sensing the hand holding the data processing device 100.

For example, in the case where the sum of power consumed by the first positional data input portion 140(1) and power consumed by the second positional data input portion 140(2) is larger than power consumed by the first positional data input portion 140(1), only the second positional data input portion 140(2) may be driven and drive of the first positional data input portion 140(1) may be stopped in a standby state of the data processing device 100. Stopping drive of the first positional data input portion 140(1) can reduce power consumption.

The proximity sensor 142 senses proximity or touch of an object (e.g., a finger or a palm), and a capacitor or an imaging element can be used as the proximity sensor. Note that a substrate provided with capacitors arranged in a matrix can be referred to as a capacitive touch sensor, and a substrate provided with an imaging element can be referred to as an optical touch sensor.

For the flexible substrate 141, a resin that is thin enough to have flexibility can be used. Specific examples of the resin include a polyester, a polyolefin, a polyamide (such as a nylon or an aramid), a polyimide, a polycarbonate, and an acrylic resin.

Additionally, as a normal non-flexible substrate, a glass substrate, a quartz substrate, a semiconductor substrate, or the like can be used.

Note that a flexible positional data input portion which can be bent at a position overlapping with the first curved portion 120c(1) can be used as the positional data input portion 140. Specific examples of structures that can be employed in the positional data input portion 140 are described in Embodiments 4 to 6.

<<Communication Portion>>

The communication portion 160 supplies the data COM supplied by the arithmetic device 110 to a device or a communication network outside the data processing device 100. Furthermore, the communication portion 160 acquires the data COM from the device or communication network outside the data processing device 100 and supplies the data COM.

The data COM can include a variety of instructions or the like in addition to audio data, image data, and the like. For example, the data COM can include an operating instruction to make the arithmetic portion 111 generate or delete the first image data V1 and the second image data V2.

A communication unit for connection to the external device or external communication network, e.g., a hub, a router, or a modem, can be used for the communication portion 160. Note that the connection method is not limited to a method using a wire, and a wireless method (e.g., radio wave or infrared rays) may be used.

<<Input and Output Portion>>

As the input and output portion 145, for example, a camera, a microphone, a read-only external memory portion, an external memory portion, a scanner, a speaker, or a printer can be used (see FIG. 1).

Specifically, as the camera, a digital camera, a digital video camera, or the like can be used.

As the external memory portion, a hard disk, a removable memory, or the like can be used. As the read-only external memory portion, a CD-ROM, a DVD-ROM, or the like can be used.

<<Arithmetic Device>>

The arithmetic device 110 includes the arithmetic portion 111 and the memory portion 112. The arithmetic device 110 supplies the first image data V1 and the second image data V2 and is supplied with the first sensing data S1 and the second sensing data S2 (see FIG. 1).

For example, the arithmetic device 110 supplies the first image data V1 and the second image data V2 including an image used for operation of the data processing device 100.

Note that the first image data V1 is displayed on the first display portion 130(1), and the second image data V2 is displayed on the second display portion 130(2).

The arithmetic device 110 may be configured to be supplied with the first positional data L1 and the second positional data L2. For example, by touching a position of the first positional data input portion 140(1) overlapping with the image used for operation, which is displayed on the first display portion 130(1), with a finger or the like, the user of the data processing device 100 can supply an operating instruction associated with the image to the arithmetic device 110. Similarly, by touching a position of the second positional data input portion 140(2) overlapping with the image used for operation, which is displayed on the second display portion 130(2), with a finger or the like, the user of the data processing device 100 can supply an operating instruction associated with the image to the arithmetic device 110.

The arithmetic device 110 may further include the transmission path 114 and the input and output interface 115.

<<Arithmetic Portion>>

The arithmetic portion 111 executes the program stored in the memory portion 112. For example, in response to supply of positional data that is associated with a position in which an image used for operation is displayed, the arithmetic portion 111 executes a program associated in advance with the image.

<<Memory Portion>>

The memory portion 112 stores the program to be executed by the arithmetic portion 111.

Note that an example of the program to be executed by the arithmetic device 110 is described in Embodiment 3.

<<Input and Output Interface and Transmission Path>>

The input and output interface 115 supplies data and is supplied with data.

The transmission path 114 can supply data, and the arithmetic portion 111, the memory portion 112, and the input and output interface 115 are supplied with the data. In addition, the arithmetic portion 111, the memory portion 112, and the input and output interface 115 can supply data, and the transmission path 114 is supplied with the data.

The data processing device 100 includes the arithmetic device 110, the input and output device 120, and the housing 101 (see FIG. 2B).

<<Housing>>

The housing 101 protects the arithmetic device 110 and the like from external stress.

The housing 101 can be formed using metal, plastic, glass, ceramics, or the like.

EXAMPLE 2 OF STRUCTURE OF DATA PROCESSING DEVICE

Another structure of a data processing device of one embodiment of the present invention will be described with reference to FIGS. 3A1, 3A2, 3A3, 3B, and 3C.

FIGS. 3A1, 3A2, 3A3, 3B, and 3C illustrate a structure of a data processing device 100B of one embodiment of the present invention.

FIGS. 3A1 and 3A2 are front and rear perspective views, respectively, of the data processing device 100B of one embodiment of the present invention. FIG. 3A3 is a top view thereof.

FIG. 3B is a schematic diagram illustrating the appearance of the positional data input portion 140 and the display portion 130 which can be used in the data processing device 100B.

FIG. 3C illustrates a usage state of the data processing device 100B.

The data processing device 100B described in this embodiment differs from the data processing device 100 described with reference to FIGS. 2A, 2B, 2C1, 2C2, and 2D, in including the second sensing portion 150(2) that senses an object obscuring the second display portion 130(2)

and supplies the second sensing data S2. Different parts are described in detail below, and the above description is referred to for the other similar parts.

In the data processing device 100B described in this embodiment, the input and output device 120 includes the second sensing portion 150(2) that senses an object obscuring the second display portion 130(2) and supplies the second sensing data S2.

The arithmetic device 110 is supplied with the second sensing data S2.

The arithmetic portion 111 generates the first image data V1 and/or the second image data V2 based on the first sensing data S1 and/or the second sensing data S2.

The data processing device 100B described in this embodiment can generate image data based on sensing data supplied from one region and display it on the input and output device. Consequently, a novel data processing device can be provided.

When the data processing device 100B is put in a breast pocket of user's clothes with the second region 120(2) facing upward, the user can easily see text or image information displayed on the second region 120(2) while the data processing device 100B is placed in the pocket (see FIG. 3C).

For example, the user can see, from above, the second region 120(2) displaying the phone number, name, and the like of the caller of an incoming call.

Note that the data processing device 100B can be provided with a vibration sensor or the like and a memory device that stores a program for shifting a mode into an incoming call rejection mode in accordance with vibration sensed by the vibration sensor or the like. Thus, the user can shift the mode into the incoming call rejection mode by tapping the data processing device 100B over his/her clothes so as to apply vibration.

<<Display Portion>>

There is no particular limitation on the display portion 130 as long as the display portion 130 can display supplied image data (see FIG. 3B). For example, the display portion that can be used in the data processing device 100 can be used in the data processing device 100B.

The display portion 130 includes the first display portion 130(1) and the second display portion 130(2). Note that a plurality of second display portions 130(2) may be provided.

The first display portion 130(1) displays the first image data V1 that is supplied thereto, and the second display portion 130(2) displays the second image data V2 that is supplied thereto.

The first display portion 130(1) and the second display portion 130(2) may be driven as one display portion. For example, one driver circuit may supply signals to select scan lines.

The first display portion 130(1) and the second display portion 130(2) may be driven as different display portions. For example, separate driver circuits may be provided for the display portions, and the driver circuits may supply signals to select scan lines to the corresponding display portions.

For example, when the data processing device 100B is in a standby state, only the second display portion 130(2) may be driven, and drive of the first display portion 130(1) may be stopped. Stopping drive of the first display portion 130(1) can reduce power consumption.

Note that a flexible display portion which can be bent at positions overlapping with the first curved portion 120c(1) and the second curved portion 120c(2) can be used as the display portion 130. Specific examples of structures that can be employed in the display portion 130 are described in Embodiments 4 to 6.

<<Sensing Portion>>

The sensing portion 150 senses the states of the data processing device 100B and the circumstances and supplies sensing data (see FIG. 1 and FIGS. 3A1 and 3A2).

The sensing portion 150 includes the first sensing portion 150(1) and the second sensing portion 150(2). The first sensing portion senses an object obscuring the first display portion 130(1), and the second sensing portion senses an object obscuring the second display portion 130(2). Then, the first sensing portion 150(1) supplies the first sensing data S1 including data about whether the first display portion 130(1) is obscured or not, and the second sensing portion 150(2) supplies the second sensing data S2 including data about whether the second display portion 130(2) is obscured or not. Note that in the case where a plurality of second display portions are provided, the second sensing data includes data about whether any one of the second display portions is obscured or not.

A sensing element that can be used in the first sensing portion 150(1) can be used in the second sensing portion 150(2). For example, a photoelectric conversion element provided so as to sense an object obscuring the second display portion 130(2) can be used in the second sensing portion 150(2).

Specifically, a photoelectric conversion element 150PD(1) is provided in the first region 120(1) so as to sense the intensity of light incident from a side where the first region 120(1) displays an image, and a photoelectric conversion element 150PD(2) is provided in the second region 120(2) so as to sense the intensity of light incident from a side where the second display portion 130(2) displays an image (see FIG. 3A1 or 3A2).

This makes it possible to sense that the first region including the photoelectric conversion element 150PD(1) and/or the second region including the photoelectric conversion element 150PD(2) of the data processing device 100B are/is covered with a protective case or cover for the data processing device 100B, clothes, or the like.

The sensing portion 150 may be configured to sense an object obscuring another display portion.

<<Positional Data Input Portion>>

There is no particular limitation on the positional data input portion 140 as long as the positional data input portion 140 can supply positional data (see FIG. 3B). For example, the positional data input portion that can be used in the data processing device 100 can be used in the data processing device 100B.

Note that a flexible positional data input portion which can be bent at a position overlapping with the first curved portion 120c(1) can be used as the positional data input portion 140. Specific examples of structures that can be employed in the positional data input portion 140 are described in Embodiments 4 to 6.

Note that this embodiment can be combined with any of the other embodiments in this specification as appropriate.

EMBODIMENT 2

In this embodiment, a structure of a data processing device of one embodiment of the present invention will be described with reference to FIG. 4 and FIGS. 5A1, 5A2, 5C, and 5D.

Figure 4:
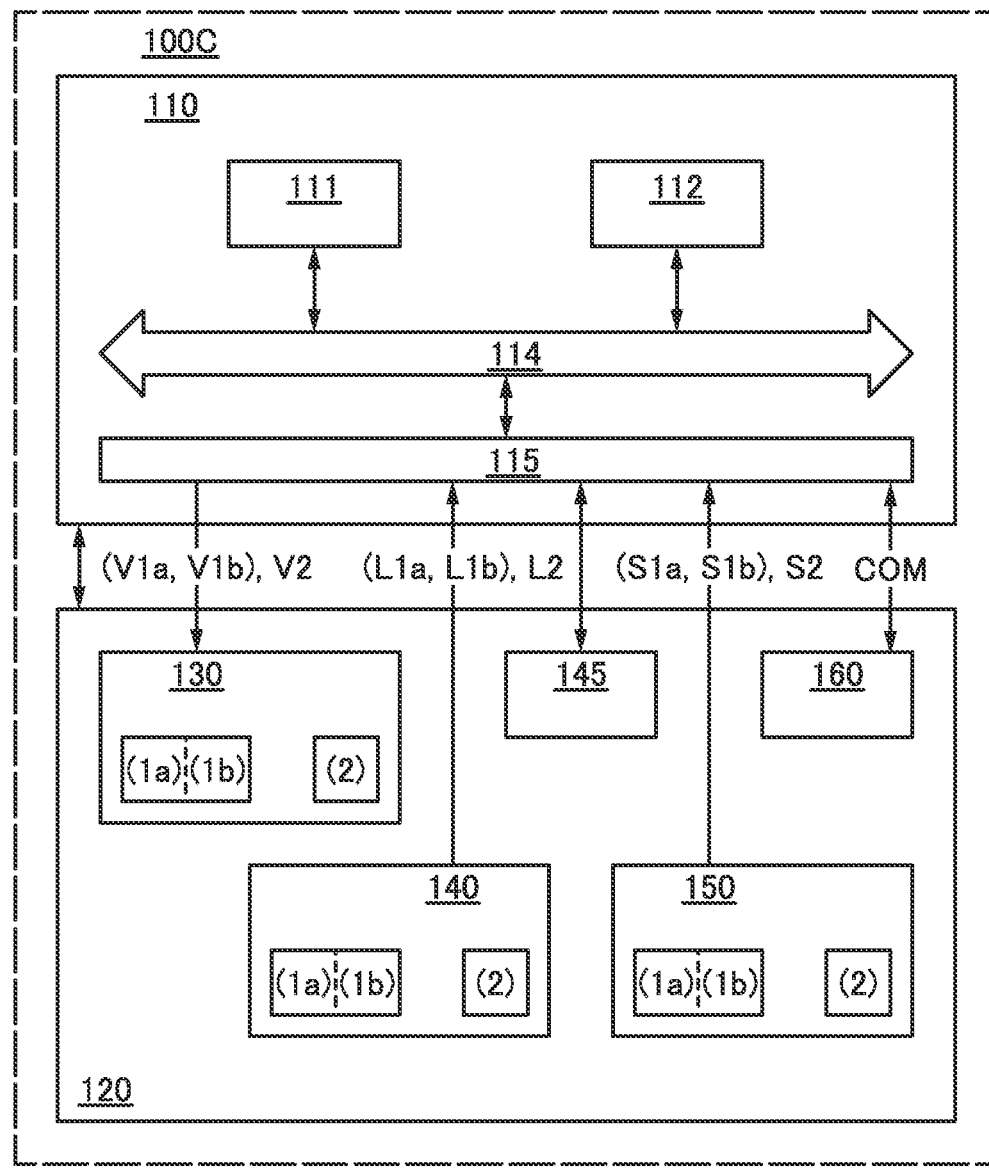
FIG. 4 is a block diagram illustrating a structure of a data processing device of an embodiment.

FIG. 4 illustrates that a display portion 130, a positional data input portion 140, and a sensing portion 150 of a data processing device 100C of one embodiment of the present invention differ from those of the data processing device 100 illustrated in FIG. 1.

FIGS. 5A1, 5A2, 5B, 5C, and 5D illustrate a structure of the data processing device 100C of one embodiment of the present invention.

FIG. 5A1 is a top view of the data processing device 100C in an unfolded state, and FIG. 5A2 is a bottom view of the data processing device 100C in the unfolded state. FIG. 5B is a side view of the data processing device 100C, and FIG. 5C is a side view including a cross section taken along a cutting-plane line Y1-Y2 in FIG. 5A1.

FIGS. 6A1, 6A2, 6B1, and 6B2 illustrate the data processing device 100C in half-folded states. FIGS. 6A1 and 6A2 are side views illustrating a folded state in which a display portion in a first region 120(1) faces inward. FIGS. 6B1 and 6B2 are side views illustrating a folded state in which the display portion in the first region 120(1) faces outward.

EXAMPLE 3 OF STRUCTURE OF DATA PROCESSING DEVICE

The data processing device 100C described in this embodiment (see FIG. 4) differs from the data processing device 100 described in Embodiment 1 with reference to FIG. 1, in the following points: the input and output device 120 is supplied with first image data V1 (V1 includes V1*a* and V1*b*) and the second image data V2 and supplies first positional data L1 (L1 includes L1*a* and L1*b*), the second positional data L2, first sensing data S1 (S1 includes S1*a* and S1*b*), and the second sensing data S2; the first display portion 130(1) includes a display portion 130(1*a*) and a display portion 130(1*b*); the first positional data input portion 140(1) includes a positional data input portion 140(1*a*) and a positional data input portion 140(1*b*); the first sensing portion 150(1) includes a sensing portion 150(1*a*) and a sensing portion 150(1*b*); and the first region 120(1) includes the input and output device that can be folded or unfolded. Different parts are described in detail below, and the above description is referred to for the other similar parts.

The input and output device 120 includes the first region 120(1) and the second region 120(2). The first region 120(1) includes the region 120(1*a*) and the region 120(1*b*). The first region 120(1) can be folded at a portion between the region 120(1*a*) and the region 120(1*b*) (see FIG. 4).

The region 120(1*a*) includes the display portion 130(1*a*) and the positional data input portion 140(1*a*), and the region 120(1*b*) includes the display portion 130(1*b*) and the positional data input portion 140(1*b*) (see FIG. 4 and FIG. 5C).

The second region 120(2) includes the display portion 130(2) and the positional data input portion 140(2).

The sensing portion 150 includes the sensing portion 150(1*a*), the sensing portion 150(1*b*), and the sensing portion 150(2). The sensing portion 150(1*a*) is provided in a housing 15*a* so as to be able to sense an object obscuring the display portion in the region 120(1*a*), and the sensing portion 150(1*b*) is provided in a housing so as to be able to sense an object obscuring the display portion in the region 120(1*b*) (see FIG. 5A1).

FIGS. 6A1 and 6A2 are side views of the data processing device 100C in a half-folded state in which the sensing portion 150(1*a*) is located on the inner side. The region 120(1*a*) faces the region 120(1*b*), and the region 120(1*a*) is obscured by the region 120(1*b*). The region 120(1*b*) is obscured by the region 120(1*a*).

The second region 120(2) of the data processing device 100C in this folded state can display an image in one direction indicated by an arrow in FIG. 6A1.

The folded state in which the first region 120(1) faces inward can be found from the sensing data S1*a* supplied from the sensing portion 150(1*a*) and/or the sensing data S1*b* supplied from the sensing portion 150(1*b*). Then, drive of an obscured portion of the first display portion 130(1) may be stopped. This can reduce power consumption.

FIGS. 6B1 and 6B2 illustrate the data processing device 100C in a half-folded state in which the sensing portion 150(1*a*) is located on the outer side. A back side of the region 120(1*a*) faces a back side of the region 120(1*b*), and the region 120(1*a*) or the region 120(1*b*) is not obscured by the other region.

The first region 120(1) of the data processing device 100C in this folded state can display an image in three directions indicated by arrows in FIG. 6B2. In addition, the second region 120(2) can display an image in another direction.

The orientation of the data processing device 100C or the like can be found from the sensing data S1*a* supplied from the sensing portion 150(1*a*), the sensing data S1*b* supplied from the sensing portion 150(1*b*), or sensing data supplied from a gravity sensor or a gyro sensor. Then, a portion where display is not necessary in the first region 120(1) may be determined from a combination of these pieces of sensing data, and its drive may be stopped. This can reduce power consumption.

The data processing device 100C includes the first region 120(1) which can be folded or unfolded. Accordingly, the data processing device 100C can be used with the first region having a highly portable size or a highly browsable size. Consequently, a novel data processing device can be provided.

The data processing device 100C includes the input and output device 120 that is supplied with the first image data V1 and the second image data V2 and supplies the first sensing data S1, and an arithmetic device 110 that supplies the first image data V1 and the second image data V2 and is supplied with the first sensing data S1 (see FIG. 4).

The input and output device 120 includes a terminal 125 that is supplied with the first image data V1 and the second image data V2, the first display portion 130(1) that is supplied with and displays the first image data V1, the second display portion 130(2) that is supplied with and displays the second image data V2, and the first sensing portion 150(1) that senses an object obscuring the first display portion 130(1) and supplies the first sensing data S1 (FIG. 4 and FIG. 5C).

The input and output device 120 also includes the first region 120(1) provided with the first display portion 130(1), the second region 120(2) provided with the second display portion 130(2), a third region 120(3) provided with the terminal 125, the first curved portion 120*c*(1) between the first region 120(1) and the second region 120(2), and the second curved portion 120*c*(2) between the first region 120(1) and the third region 120(3) (FIG. 5C).

The third region 120(3) supplies the first image data V1 and the second image data V2. The first region 120(1) is supplied with the first image data V1 and the second image data V2 and supplies the second image data V2. The second region 120(2) is supplied with the second image data V2 (FIG. 5D).

The arithmetic portion 111 generates the first image data V1 or the second image data V2 based on the first sensing data S1.

The data processing device 100C includes the first region 120(1) provided with the first display portion 130(1), the second region 120(2) provided with the second display portion 130(2), the third region 120(3) provided with the terminal 125, the first curved portion 120c(1) between the first region 120(1) and the second region 120(2), and the second curved portion 120c(2) between the first region 120(1) and the third region 120(3). Accordingly, the terminal 125 can supply the first image data V1 and the second image data V2. The first region 120(1) can display the first image data V1 and supplies the second image data V2, and the second region 120(2) can display the second image data V2. Consequently, a novel data processing device can be provided.

Individual components included in the data processing device 100C are described below. Note that these portions cannot be clearly distinguished and one portion also serves as another portion or includes part of another portion in some cases.

The data processing device 100C differs from the data processing device described in Embodiment 1 in that a foldable housing is included and that the first region 120(1) can be folded. Different parts are described in detail below, and the above description is referred to for the other similar parts.

<<Entire Structure>>

The data processing device 100C includes the input and output device 120, and the input and output device 120 includes the first region 120(1) which can be folded or unfolded. In the input and output device 120, the second region 120(2) is provided such that the first curved portion 120c(1) is located between the first region 120(1) and the second region 120(2), and the third region 120(3) is provided such that the second curved portion 120c(2) is located between the first region 120(1) and the third region 120(3) (see FIG. 4 and FIGS. 5A1, 5A2, 5B, 5C, and 5D). Note that a signal line is provided in the first region 120(1), the second region 120(2), and the third region 120(3), and the first region 120(1) is electrically connected to the second region 120(2) and the third region 120(3).

The first region 120(1) can be folded or unfolded and is held in a foldable housing.

Note that the sensing portion 150(1a) and the sensing portion 150(1b) may be provided.

<<Housing>>

The housing allows the first region 120(1) to be folded or unfolded.

For example, the data processing device 100C includes housings 13a and 13b which are flexible and the housings 15a and 15b which are less flexible than the housings 13a and 13b.

A flexible member or a hinge can be used for the foldable housing. Note that the housing may be folded or unfolded by a method using user's hands, a spring, a motor, a piezoelectric element, or the like.

Specifically, a resin, a rubber, a silicone rubber, or the like can be used for the flexible member. Alternatively, a metal, an alloy, an engineering plastic, or the like can be used for the hinge.

The data processing device 100C may include a housing that is more rigid than the foldable housing.

The housing 13a is shaped so as not to obscure the first region 120(1) and the second region 120(2) (see FIG. 5A1), and the display portion 130 and the positional data input portion 140 are provided between the housing 13a and the housing 13b (see FIG. 5B).

The housings 13a and 13b connect the housings 15a and 15b (see FIGS. 5A1 and 5A2).

The housing 15a is shaped so as not to obscure the first region 120(1) (see FIGS. 5A1 and 5C).

In the housing 15a, the arithmetic device 110 is stored. The arithmetic device 110 includes the terminal that supplies the first image data V1 and the second image data V2 and is supplied with the first sensing data S1.

The housing 15b has an opening so as not to obscure the first region 120(1) and the second region 120(2). Specifically, the housing 15a has an opening so as not to obscure the first region 120(1), and the housing 15b has an opening at a right-hand side surface so as not to obscure the second region 120(2).

Note that a user of the data processing device 100C can hold the data processing device 100C with the other hand such that the second region 120(2) is positioned on a left-hand side.

The first image data V1 or the second image data V2 may be generated on the basis of sensing data about the orientation of the data processing device 100C which is supplied from the sensing portion 150. Accordingly, favorable display can be performed according to which hand is used to hold the data processing device 100C. For example, a user can hold the housing 15a with his/her left hand so that his/her right hand can be used to supply positional data from the positional data input portion 140(2) in the second region 120(2).

<<Display Portion and Positional Data Input Portion>>

The input and output device 120 includes the first region 120(1) that can be folded. Note that the first region 120(1) includes the first display portion 130(1) and the first sensing portion 150(1).

For example, an input and output device including a flexible substrate and a thin film element formed over the flexible substrate can be used as the input and output device 120.

With the use of a foldable input and output device in the first region 120(1) and the second region 120(2), the first region 120(1) and the second region 120(2) can be integrated. Note that specific examples of structures that can be employed in the foldable input and output device 120 are described in Embodiments 4 to 6.

The input and output device 120 includes the terminal 125 in the third region 120(3). The third region 120(3) includes the terminal 125 that is supplied with the first image data V1 and the second image data V2 and supplies the first sensing data S1 (see FIG. 5D).

The input and output device 120 includes a plurality of wirings. For example, a wiring 126 is electrically connected to the terminal 125, through which a signal, a power supply potential, or the like can be supplied to the terminal.

Specifically, through a wiring in the third region 120(3), the first image data V1 and the second image data V2 supplied thereto are supplied to the first region 120(1). Through a wiring in the first region 120(1), the second image data V2 supplied thereto is supplied to the second region 120(2).

Note that this embodiment can be combined with any of the other embodiments in this specification as appropriate.

EMBODIMENT 3

In this embodiment, a structure of a data processing device of one embodiment of the present invention will be described with reference to FIGS. 7 and 8.

FIG. 7 is a flowchart showing a program for the data processing device of one embodiment of the present invention. FIG. 8 is a flowchart illustrating an interrupt processing of the program described with reference to FIG. 7.

EXAMPLE 1 OF STRUCTURE OF DATA PROCESSING DEVICE

The data processing devices 100, 100B, and 100C described in this embodiment each include the memory portion 112 that stores the program including the following steps.

<<First Step>>

In a first step, initial data including status data is acquired (S1 in FIG. 7).

The initial data used in a later step is acquired. For example, as the status data, predetermined data may be used, or sensing data supplied from the sensing portion may be used.

<<Second Step>>

In a second step, an interrupt processing is allowed (S2 in FIG. 7). Note that when the interrupt processing is allowed, the arithmetic portion 111 can receive an instruction to execute the interrupt processing. The arithmetic portion 111 that has received the instruction to execute the interrupt processing stops the main processing and executes the interrupt processing. For example, the arithmetic portion 111 that has received an event associated with the instruction executes the interrupt processing, and stores the execution result in the memory portion. Then, the arithmetic portion 111 that has returned from the interrupt processing can resume the main processing on the basis of the execution result of the interrupt processing.

<<Third Step>>

In a third step, predetermined data is acquired (S3 in FIG. 7).

Predetermined data which is the basis of first image data or second image data generated in a later step is acquired. For example, image data or text data whose size has not yet been optimized for the first region 120(1) or the second region 120(2) is acquired. Note that an operating instruction or data supplied in the interrupt processing is reflected in the third and subsequent steps.

<<Fourth Step>>

In a fourth step, a fifth step is selected when the status data shows a first status, or a sixth step is selected when the status data shows a second status (S4 in FIG. 7).

For example, the fifth step is selected when the first region 120(1) is not obscured according to the status data determined on the basis of the first sensing data S1 supplied from the first sensing portion 150(1), or the sixth step is selected when the first region 120(1) is obscured.

<<Fifth Step>>

In the fifth step, the first image data V1 is generated on the basis of the data acquired in the third step, and the first image data V1 is displayed on the first display portion 130(1) (S5 in FIG. 7).

For example, the first image data V1 is generated such that text information is displayed in a single line or a plurality of lines. It can also be generated on the basis of the orientation or size of the first display portion 130(1) or a preferred design set by a user.

<<Sixth Step>>

In the sixth step, the second image data V2 is generated on the basis of the data acquired in the third step, and the second image data V2 is displayed on the second display portion 130(2) (S6 in FIG. 7).

For example, the second image data V2 is generated such that text information is displayed so as to move from one side to the other. It can also be generated on the basis of the orientation or size of the second display portion 130(2) or a preferred design set by a user.

<<Seventh Step>>

In a seventh step, an eighth step is selected when a termination instruction is supplied in the interrupt processing, or the third step is selected when no termination instruction is supplied in the interrupt processing (S7 in FIG. 7).

<<Eighth Step>>

In the eighth step, the program terminates (S8 in FIG. 7).

<<Interrupt Processing>>

The interrupt processing includes the following steps.

<<Ninth Step>>

Figure 8:
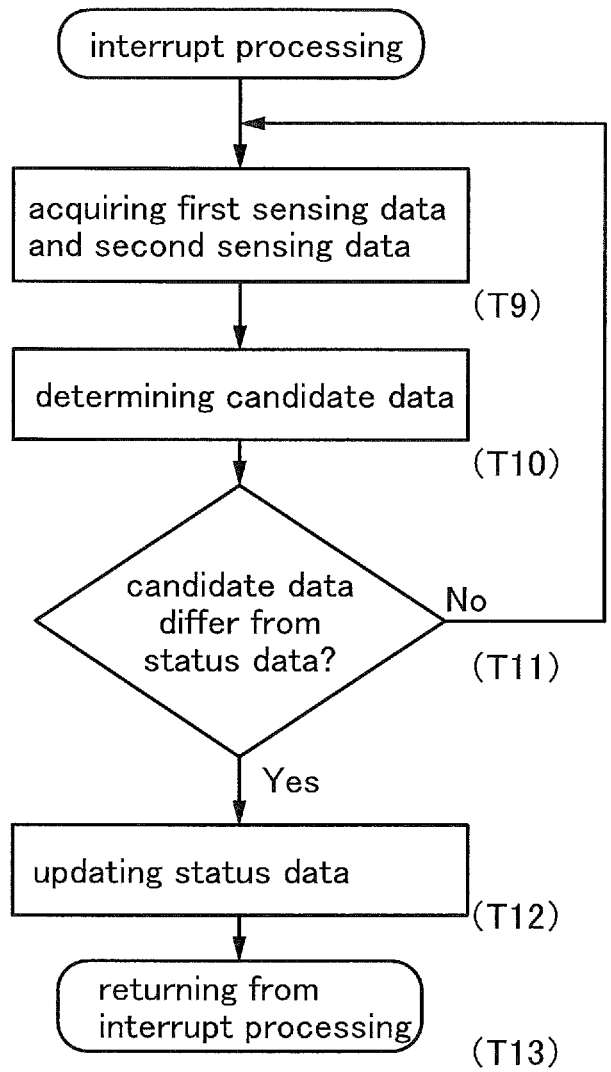
FIG. 8 is a flowchart illustrating a program stored in a memory portion of a data processing device of an embodiment.

In a ninth step, the first sensing data S1 and the second sensing data S2 are acquired (T9 in FIG. 8)

Specifically, the first sensing data S1 supplied from the first sensing portion 150(1) and the second sensing data S2 supplied from the second sensing portion 150(2) are acquired using a timer or the like.

<<Tenth Step>>

In a tenth step, candidate data based on the first sensing data S1 is determined (T10 in FIG. 8).

<<Eleventh Step>>

In an eleventh step, a twelfth step is selected when the candidate data differs from the status data, or the ninth step is selected when the candidate data is the same as the status data (T11 in FIG. 8).

<<Twelfth Step>>

In the twelfth step, the status data is updated with the candidate data (T12 in FIG. 8).

For example, the status data is updated when there is a change in the first sensing data S1.

<<Thirteenth Step>>

In a thirteenth step, the operation returns from the interrupt processing (T13 in FIG. 8).

Note that the status data updated in the interrupt processing is reflected in the third and subsequent steps. The operation proceeds to the eighth step and terminates when a termination instruction is supplied in the interrupt processing.

In the above-described data processing device of one embodiment of the present invention, the program includes the step of determining the candidate data by acquiring the first sensing data; the step of updating the status data with the candidate data when the status data differs from the candidate data; and the step of generating and displaying image data including predetermined data based on the updated status data. Thus, an image including the predetermined data which is based on the status data can be displayed on a predetermined region. Consequently, a novel data processing device can be provided.

Note that this embodiment can be combined with any of the other embodiments in this specification as appropriate.

EMBODIMENT 4

In this embodiment, a structure of a bendable or foldable touch panel that can be used in the display portion 130 and the positional data input portion 140 of the data processing device of one embodiment of the present invention will be described with reference to FIGS. 9A to 9C.

Figure 9A:
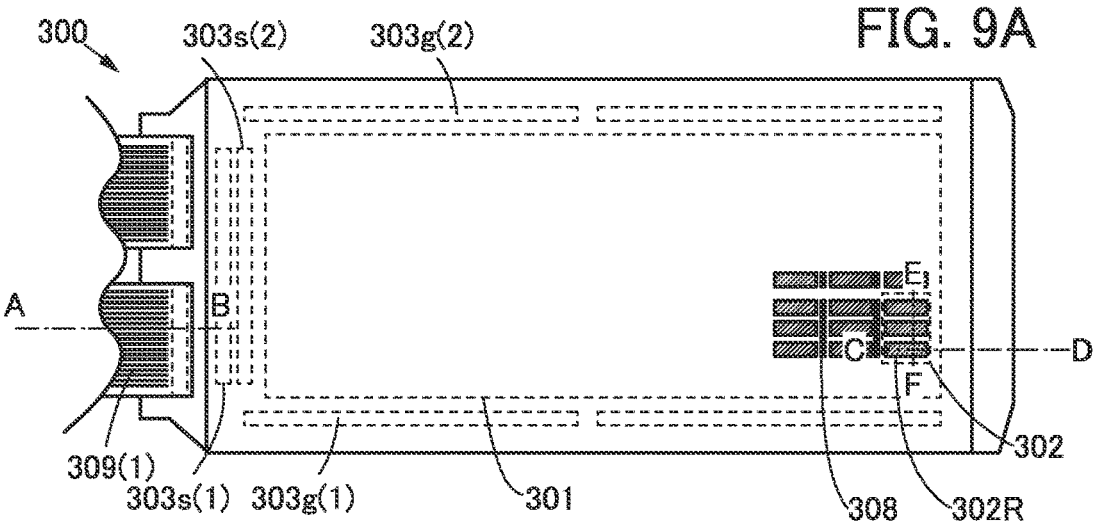
FIGS. 9A to 9C illustrate a structure of a touch panel that can be used in a data processing device of an embodiment.

FIG. 9A is a top view illustrating the structure of the touch panel that can be used in the data processing device of one embodiment of the present invention.

Figure 9B:
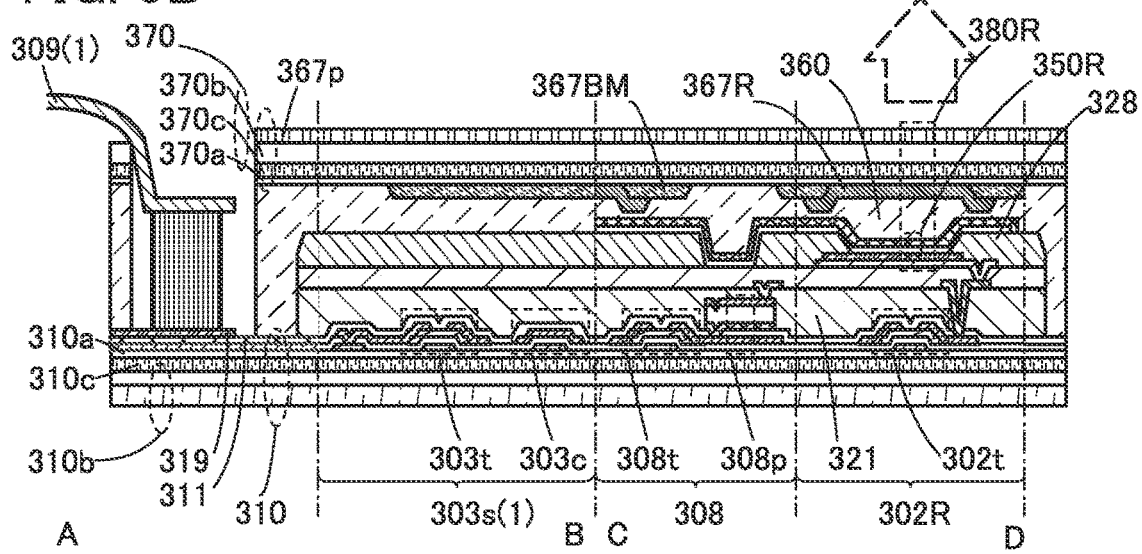

FIG. 9B is a cross-sectional view taken along cutting-plane lines A-B and C-D in FIG. 9A.

Figure 9C:
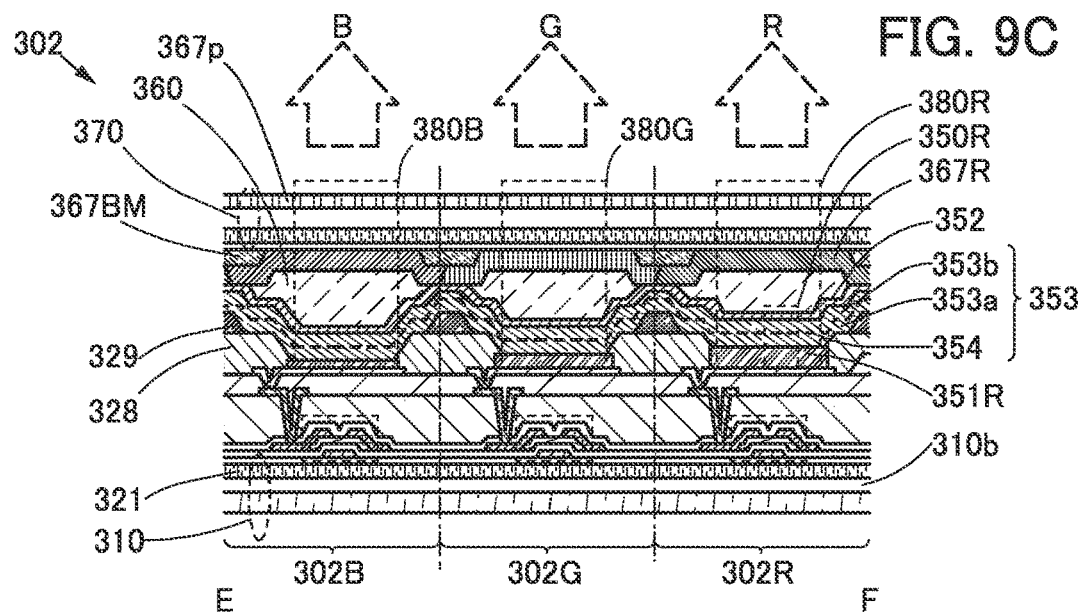

FIG. 9C is a cross-sectional view taken along a cutting-plane line E-F in FIG. 9A.

<Top View>

A touch panel 300 described as an example in this embodiment includes a display portion 301 (see FIG. 9A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In the sub-pixels, light-emitting elements and pixel circuits that can supply electric power for driving the light-emitting elements are provided.

The pixel circuits are electrically connected to wirings through which selection signals and image signals are supplied.

The touch panel 300 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals and power supply potentials are supplied.

Examples of the control signals include a signal for selecting an imaging pixel circuit from which a recorded imaging signal is read, a signal for initializing an imaging pixel circuit, and a signal for determining the time for an imaging pixel circuit to sense light.

The touch panel 300 is provided with an imaging pixel driver circuit 303g(2) that can supply control signals to the imaging pixels 308 and an imaging signal line driver circuit 303s(2) that reads out imaging signals.

<Cross-Sectional View>

The touch panel 300 includes a substrate 310 and a counter substrate 370 opposite to the substrate 310 (see FIG. 9B).

By using a flexible material for the substrate 310 and the counter substrate 370, the touch panel 300 can have flexibility.

Note that when the flexible touch panel 300 is changed in shape, stress is applied to a functional element provided in the touch panel 300. A functional element is preferably positioned in the center between the substrate 310 and the counter substrate 370 because a change in shape of the functional element can be prevented.

Furthermore, the substrate 310 is preferably formed using a material whose coefficient of linear expansion is substantially equal to that of the counter substrate 370. For example, the coefficients of linear expansion of the materials are preferably lower than or equal to $1 \times 10^{-3}$/K, further preferably lower than or equal to $5 \times 10^{-5}$/K, and still further preferably lower than or equal to $1 \times 10^{-5}$/K.

For example, materials that include polyester, polyolefin, polyamide (e.g., nylon, aramid), polyimide, polycarbonate, or a resin having an acrylic bond, a urethane bond, an epoxy bond, or a siloxane bond can be used for the substrate 310 and the counter substrate 370.

The substrate 310 is a stacked body in which a substrate 310b having flexibility, a barrier film 310a that prevents unintentional diffusion of impurities to the light-emitting elements, and a resin layer 310c that attaches the barrier film 310a to the substrate 310b are stacked.

The counter substrate 370 is a stacked body including a substrate 370b having flexibility, a barrier film 370a that prevents unintentional diffusion of impurities to the light-emitting elements, and a resin layer 370c that attaches the barrier film 370a to the substrate 370b (see FIG. 9B).

A sealant 360 attaches the counter substrate 370 to the substrate 310. The sealant 360, also serving as an optical adhesive layer, has a refractive index higher than that of air. The pixel circuits and the light-emitting elements (e.g., a first light-emitting element 350R) are provided between the substrate 310 and the counter substrate 370.

<<Structure of Pixel>>

Each of the pixels 302 includes the sub-pixel 302R, a sub-pixel 302G, and a sub-pixel 302B (see FIG. 9C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 9B). The light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 9C).

The layer 353 containing a light-emitting organic compound includes a light-emitting unit 353a, a light-emitting unit 353b, and an intermediate layer 354 between the light-emitting units 353a and 353b.

The first coloring layer 367R of the light-emitting module 380R is provided on the counter substrate 370. The coloring layer transmits light of a particular wavelength and is, for example, a layer that selectively transmits light of red, green, or blue color. A region that transmits light emitted from the light-emitting element as it is may be provided.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 that also serves as an optical adhesive layer and through the first coloring layer 367R and is emitted to the outside of the light-emitting module 380R as indicated by arrows in FIGS. 9B and 9C.

<<Structure of Display Panel>>

The touch panel 300 includes a light-blocking layer 367BM on the counter substrate 370. The light-blocking layer 367BM is provided so as to surround the coloring layer (e.g., the first coloring layer 367R).

The touch panel 300 includes an anti-reflective layer 367p positioned in a region overlapping with the display portion 301. As the anti-reflective layer 367p, a circular polarizing plate can be used, for example.

The touch panel 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300 includes the light-emitting elements (e.g., the first light-emitting element 350R) over the insulating film 321.

The touch panel 300 includes, over the insulating film 321, a partition wall 328 that overlaps with an end portion of the first lower electrode 351R (see FIG. 9C). In addition, a spacer 329 that controls the distance between the substrate 310 and the counter substrate 370 is provided over the partition wall 328.

<<Structure of Image Signal Line Driver Circuit>>

The image signal line driver circuit 303s(1) includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Components>>

The touch panel 300 includes a wiring 311 through which a signal is supplied. The wiring 311 is provided with a terminal 319. Note that an FPC 309(1) through which a signal such as an image signal or a synchronization signal is supplied is electrically connected to the terminal 319.

Note that a printed wiring board (PWB) may be attached to the FPC 309(1).

Transistors formed in the same process can be used as the transistor 302t, the transistor 303t, the transistor 308t, and the like.

Transistors of a bottom-gate type, a top-gate type, or the like can be used.

Any of various kinds of semiconductors can be used in the transistors. For example, an oxide semiconductor, single crystal silicon, polysilicon, amorphous silicon, or the like can be used.

Note that this embodiment can be combined with any of the other embodiments in this specification as appropriate.

EMBODIMENT 5

In this embodiment, a structure of a bendable or foldable touch panel that can be used in the data processing device of one embodiment of the present invention will be described with reference to FIGS. 10A and 10B and FIGS. 11A to 11C.

Figure 10A:
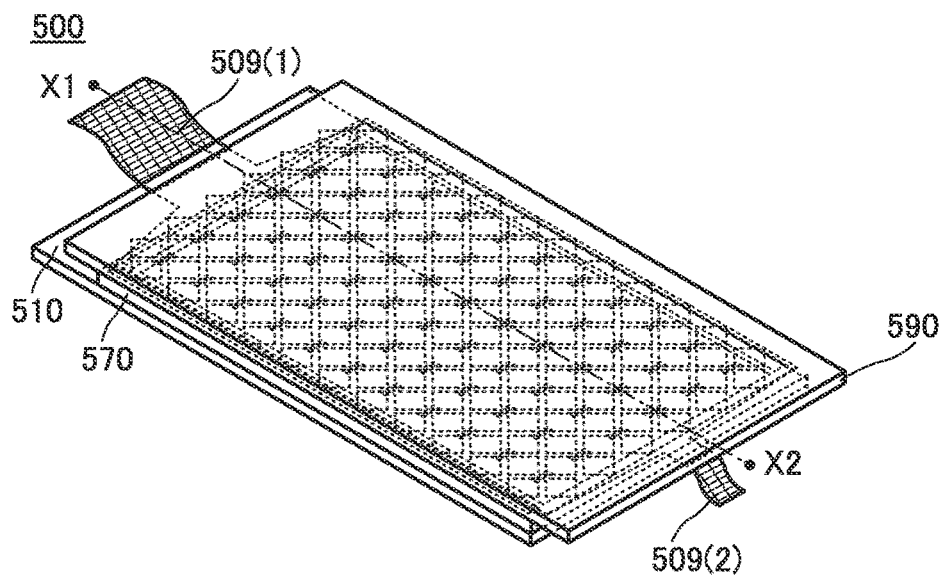
FIGS. 10A and 10B illustrate a structure of a touch panel that can be used in a data processing device of an embodiment.
Figure 10B:
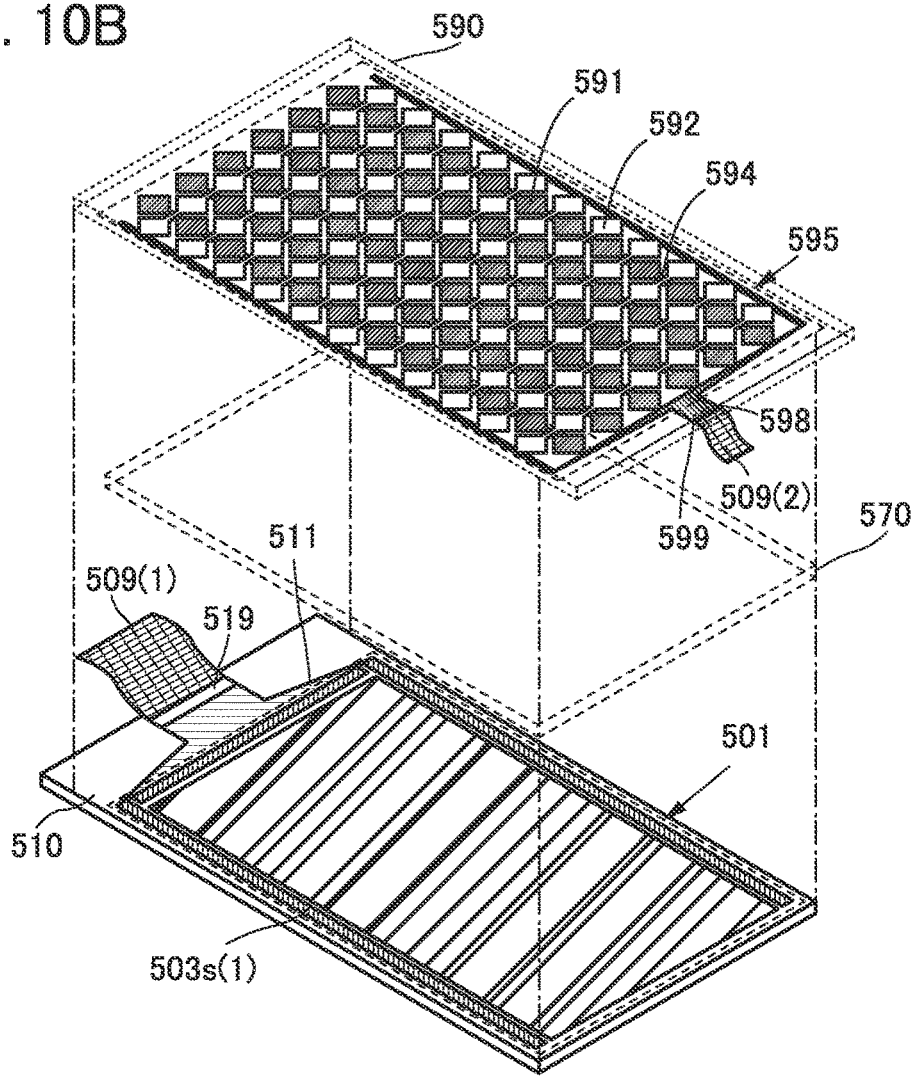

FIG. 10A is a perspective view of a touch panel 500 described as an example in this embodiment. Note that FIGS. 10A and 10B illustrate only main components for simplicity. FIG. 10B is a developed perspective view of the touch panel 500.

Figure 11A:
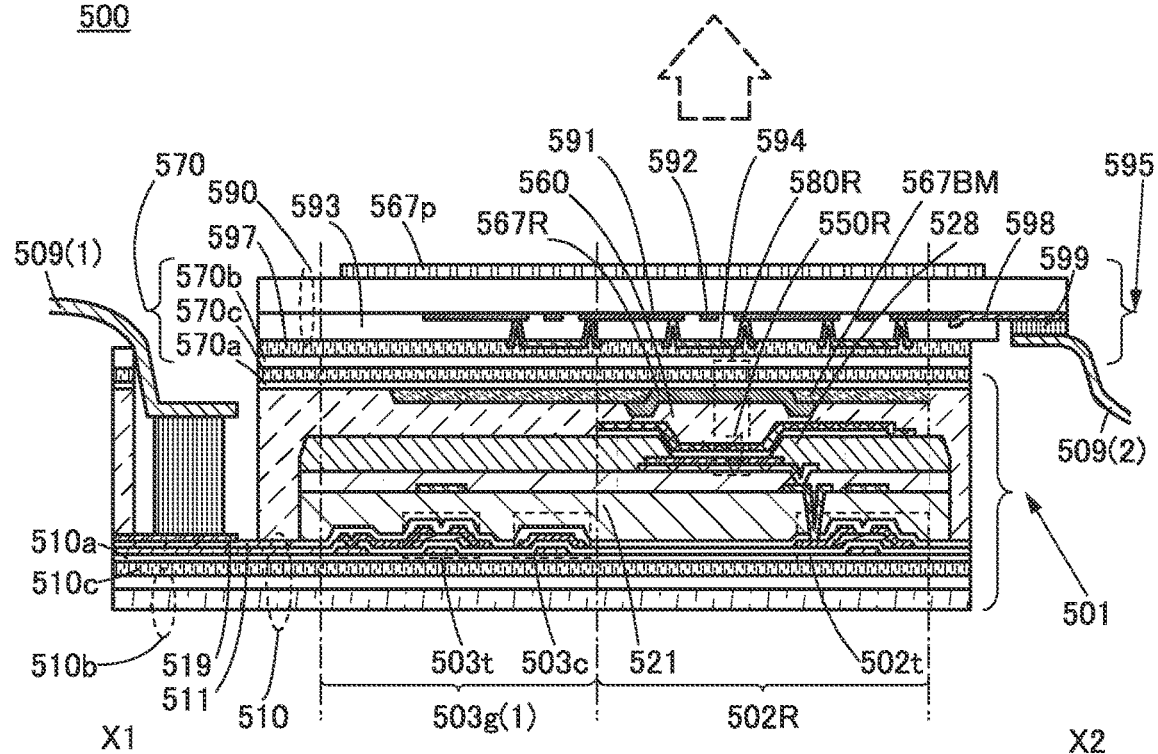
FIGS. 11A to 11C each illustrate a structure of a touch panel that can be used in a data processing device of an embodiment.
Figure 11B:
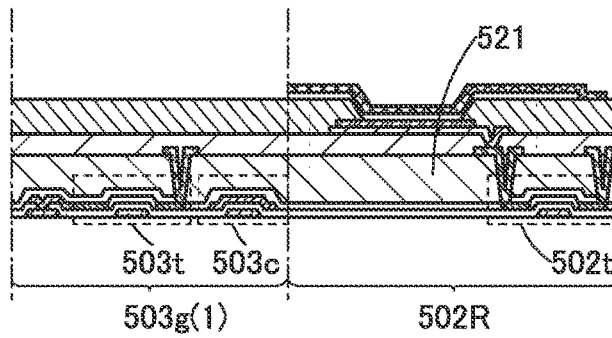
Figure 11C:
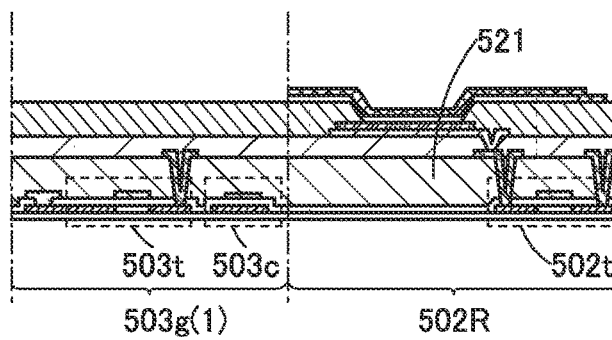

FIGS. 11A to 11C are cross-sectional views of the touch panel 500 taken along line X1-X2 in FIG. 10A.

The touch panel 500 includes a display portion 501 and a touch sensor 595 (see FIG. 10B). The touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, a plurality of wirings 511 through which signals are supplied to the pixels, and an image signal line driver circuit 503s(1). The plurality of wirings 511 are led to a peripheral portion of the substrate 510, and parts of the plurality of wirings 511 form a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 are led to a peripheral portion of the substrate 590, and parts of the plurality of wirings 598 form a terminal. The terminal is electrically connected to an FPC 509(2). Note that in FIG. 10B, electrodes, wirings, and the like of the touch sensor 595 provided on the back side of the substrate 590 (the side facing the substrate 510) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive type is preferable because multiple points can be sensed simultaneously.

An example of using a projected capacitive touch sensor is described below with reference to FIG. 10B.

Note that a variety of sensors that can sense proximity or touch of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 10A and 10B.

The electrodes 591 each have a quadrangular shape and are arranged in a direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light passing through the touch sensor 595 can be reduced.

Note that the shapes of the electrodes 591 and the electrodes 592 are not limited thereto and can be any of a variety of shapes. For example, a structure may be employed in which the plurality of electrodes 591 are arranged so that gaps between the electrodes 591 are reduced as much as possible, and the electrodes 592 are spaced apart from the electrodes 591 with an insulating layer interposed therebetween to have regions not overlapping with the electrodes 591. In this case, it is preferable to provide, between two adjacent electrodes 592, a dummy electrode electrically insulated from these electrodes because the area of regions having different transmittances can be reduced.

The structure of the touch sensor 595 is described with reference to FIGS. 11A to 11C.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

A resin layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as an acrylic resin or an epoxy resin, a resin having a siloxane bond, and an inorganic insulating material such as silicon oxide, silicon oxynitride, or aluminum oxide.

Openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used for the wiring 594 because electric resistance can be reduced.

One electrode 592 extends in one direction, and a plurality of electrodes 592 are provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 are not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 functions as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

A connection layer 599 electrically connects the wiring 598 to the FPC 509(2).

As the connection layer 599, any of various anisotropic conductive films (ACF), anisotropic conductive pastes (ACP), or the like can be used.

The resin layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such an element.

For example, organic electroluminescent elements that emit light of different colors may be included in sub-pixels so that the light of different colors can be emitted from the respective sub-pixels.

Other than organic electroluminescent elements, any of various display elements such as display elements (electronic ink) that perform display by an electrophoretic method, an electronic liquid powder method, an electrowetting method, or the like; MEMS shutter display elements; optical interference type MEMS display elements; and liquid crystal elements can be used. Furthermore, this embodiment can be used in a transmissive liquid crystal display, a transflective liquid crystal display, a reflective liquid crystal display, a direct-view liquid crystal display, or the like. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. A structure suitable for employed display elements can be selected from a variety of structures of pixel circuits.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, a metal insulator metal (MIM), a thin film diode (TFD), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

Flexible materials can be favorably used for the substrate 510 and the substrate 570.

Materials with which unintended passage of impurities is inhibited can be favorably used for the substrate 510 and the substrate 570. For example, materials with a vapor permeability of lower than or equal to $10^{-5}$ g/m 2 day, preferably lower than or equal to $10^{-6}$ g/m 2 day can be favorably used.

The substrate 510 can be favorably formed using a material whose coefficient of linear expansion is substantially equal to that of the substrate 570. For example, the coefficients of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 510 is a stacked body in which a substrate 510b having flexibility, a barrier film 510a that prevents unintentional diffusion of impurities to the light-emitting elements, and a resin layer 510c that attaches the barrier film 510a to the substrate 510b are stacked.

For example, materials that include polyester, polyolefin, polyamide (e.g., nylon, aramid), polyimide, polycarbonate, or a resin having an acrylic bond, a urethane bond, an epoxy bond, or a siloxane bond can be used for the resin layer 510c.

The substrate 570 is a stacked body including a substrate 570b having flexibility, a barrier film 570a that prevents unintentional diffusion of impurities to the light-emitting elements, and a resin layer 570c that attaches the barrier film 570a to the substrate 570b.

A sealant 560 attaches the substrate 570 to the substrate 510. The sealant 560 has a refractive index higher than that of air. In the case where light is extracted to the sealant 560 side, the sealant 560 serves as an optical adhesive layer. The pixel circuits and the light-emitting elements (e.g., a first light-emitting element 550R) are provided between the substrate 510 and the substrate 570.

<<Structure of Pixel>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. The light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

In the case where the sealant 560 is provided on the light extraction side, the sealant 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 11A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 is provided with an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by unintentional diffusion of impurities.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided over the partition wall 528.

<<Structure of Scan Line Driver Circuit>>

A scan line driver circuit 503g(1) includes a transistor 503t and a capacitor 503c. Note that the driver circuit can be formed in the same process and over the same substrate as those of the pixel circuits.

<<Other Components>>

The display portion 501 includes the wiring 511 through which a signal is supplied. The wiring 511 is provided with the terminal 519. Note that the FPC 509(1) through which a signal such as an image signal or a synchronization signal is supplied is electrically connected to the terminal 519.

Note that a printed wiring board (PWB) may be attached to the FPC 509(1).

The display portion 501 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a stacked structure in which an alloy film or a nitride film containing one or more elements selected from titanium, tantalum, tungsten, molybdenum, chromium, neodymium, and scandium is stacked over an aluminum film can be used.

Alternatively, a light-transmitting conductive material including indium oxide, tin oxide, or zinc oxide may be used.

MODIFICATION EXAMPLE 1 OF DISPLAY PORTION

Any of various kinds of transistors can be used in the display portion 501.

A structure in which bottom-gate transistors are used in the display portion 501 is illustrated in FIGS. 11A and 11B.

For example, a semiconductor layer containing an oxide semiconductor, amorphous silicon, or the like can be used in the transistor 502t and the transistor 503t shown in FIG. 11A.

For example, a film represented by an In-M-Zn oxide that contains at least indium (In), zinc (Zn), and M (M is a metal such as Al, Ga, Ge, Y, Zr, Sn, La, Ce, or Hf) is preferably included. Alternatively, both In and Zn are preferably contained.

As a stabilizer, gallium (Ga), tin (Sn), hafnium (Hf), aluminum (Al), zirconium (Zr), or the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As an oxide semiconductor included in an oxide semiconductor film, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, a semiconductor layer containing polycrystalline silicon that is obtained by crystallization process such as laser annealing can be used in the transistor 502*t* and the transistor 503*t* shown in FIG. 11B.

A structure in which top-gate transistors are used in the display portion 501 is shown in FIG. 11C.

For example, a semiconductor layer including polycrystalline silicon, a single crystal silicon film that is transferred from a single crystal silicon substrate, or the like can be used in the transistor 502*t* and the transistor 503*t* shown in FIG. 11C.

Note that this embodiment can be combined with any of the other embodiments in this specification as appropriate.

EMBODIMENT 6

In this embodiment, a structure of a bendable or foldable touch panel that can be used in a data processing device of one embodiment of the present invention will be described with reference to FIGS. 12A to 12C.

Figure 12A:
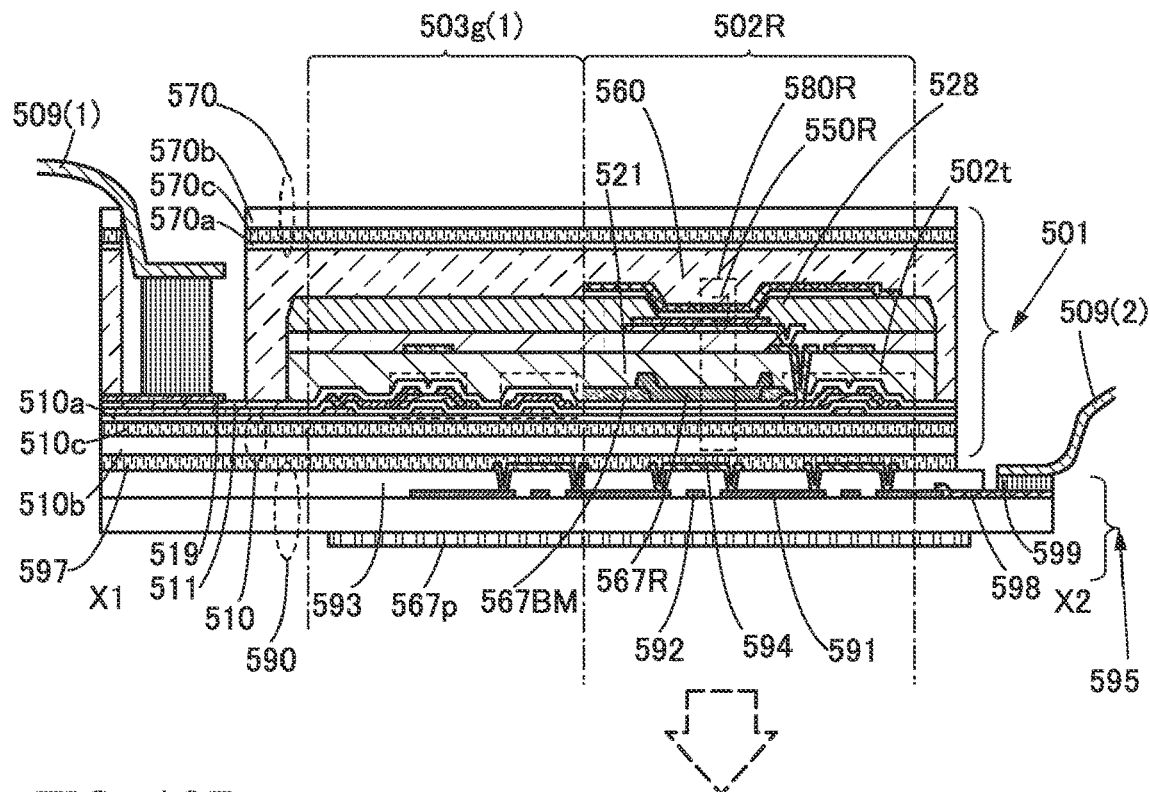
FIGS. 12A to 12C each illustrate a structure of a touch panel that can be used in a data processing device of an embodiment.
Figure 12B:
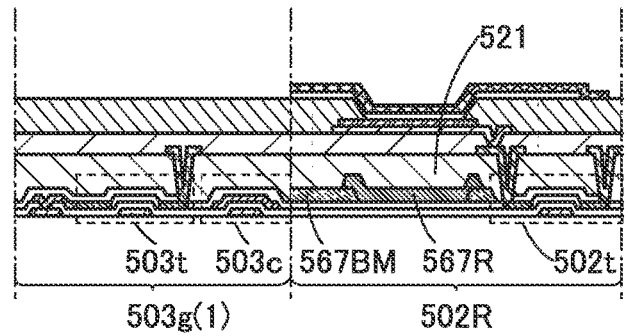
Figure 12C:
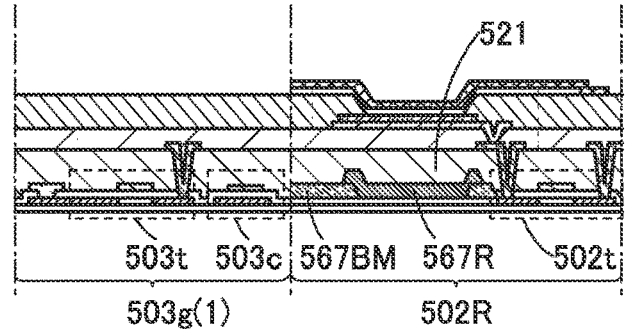

FIGS. 12A to 12C are cross-sectional views illustrating a touch panel 500B.

The touch panel 500B described in this embodiment is different from the touch panel 500 described in Embodiment 5 in that the display portion 501 displays supplied image data on the side where the transistors are provided and that the touch sensor is provided on the substrate 510 side of the display portion. Different parts are described in detail below, and the above description is referred to for the other similar parts.

<Display Portion>

The display portion 501 includes a plurality of pixels arranged in a matrix. Each of the pixels includes a display element and a pixel circuit for driving the display element.

<<Structure of Pixel>>

A pixel includes a sub-pixel 502R, and the sub-pixel 502R includes a light-emitting module 580R.

The sub-pixel 502R includes a first light-emitting element 550R and a pixel circuit that can supply electric power to the first light-emitting element 550R and includes a transistor 502*t*.

The light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The first coloring layer 567R is positioned in a region overlapping with the first light-emitting element 550R. The first light-emitting element 550R shown in FIG. 12A emits light to the side where the transistor 502*t* is provided. Accordingly, part of light emitted from the first light-emitting element 550R passes through the first coloring layer 567R and is emitted to the outside of the light-emitting module 580R as indicated by an arrow in FIG. 12A.

<<Structure of Display Portion>>

The display portion 501 includes a light-blocking layer 567BM on the light extraction side. The light-blocking layer 567BM is provided so as to surround the coloring layer (e.g., the first coloring layer 567R).

The display portion 501 includes an insulating film 521. The insulating film 521 covers the transistor 502*t*. Note that the insulating film 521 can be used as a layer for planarizing unevenness caused by the pixel circuits. A stacked film including a layer that can prevent diffusion of impurities can be used as the insulating film 521. This can prevent the reliability of the transistor 502*t* or the like from being lowered by unintentional diffusion of impurities from the first coloring layer 567R, for example.

<Touch Sensor>

A touch sensor 595 is provided on the substrate 510 side of the display portion 501 (see FIG. 12A).

A resin layer 597 is provided between the substrate 510 and the substrate 590 and attaches the touch sensor 595 to the display portion 501.

MODIFICATION EXAMPLE 1 OF DISPLAY PORTION

Any of various kinds of transistors can be used in the display portion 501.

A structure in which bottom-gate transistors are used in the display portion 501 is illustrated in FIGS. 12A and 12B.

For example, a semiconductor layer containing an oxide semiconductor, amorphous silicon, or the like can be used in the transistor 502*t* and the transistor 503*t* shown in FIG. 12A. In the transistors, a channel formation region may be sandwiched between upper and lower gate electrodes, in which case variations in characteristics of the transistors can be prevented and thus the reliability can be increased.

For example, a semiconductor layer containing polycrystalline silicon or the like can be used in the transistor 502*t* and the transistor 503*t* shown in FIG. 12B.

A structure in which top-gate transistors are used in the display portion 501 is shown in FIG. 12C.

For example, a semiconductor layer including polycrystalline silicon, a transferred single crystal silicon film, or the like can be used in the transistor 502t and the transistor 503t shown in FIG. 12C.

Note that this embodiment can be combined with any of the other embodiments in this specification as appropriate.

EMBODIMENT 7

In this embodiment, a method for manufacturing a bendable or foldable device that can be used in a data processing device of one embodiment of the present invention, an electronic device, or the like will be described with reference to FIGS. 13A to 13D, FIGS. 14A to 14D, and FIGS. 15A to 15D. Note that examples of the bendable or foldable device include a display device, a light-emitting device, an input device, and the like. Examples of the input device include a touch sensor, a touch panel, and the like. Examples of the light-emitting device include an organic EL panel, a lighting device, and the like. Examples of the display device include a light-emitting device, an organic EL panel, a liquid crystal display device, and the like. Note that a function of the input device such as a touch sensor may be provided in a display device or a light-emitting device. For example, a counter substrate (e.g., a substrate not provided with a transistor) of a display device or a light-emitting device may be provided with a touch sensor. Alternatively, an element substrate (e.g., a substrate provided with a transistor) of the display device or the light-emitting device may be provided with a touch sensor. Still alternatively, the counter substrate and the element substrate of the display device or the light-emitting device may be provided with touch sensors.

Figure 13A:
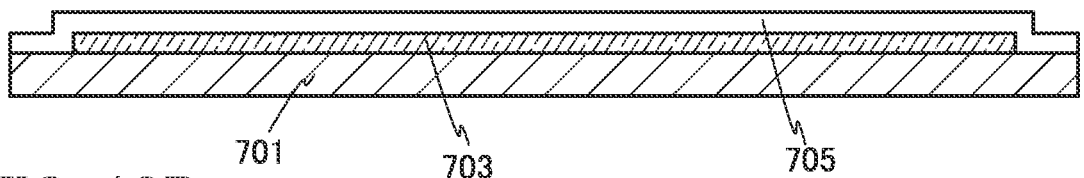
FIGS. 13A to 13D illustrate a method for manufacturing a bendable or foldable device of an embodiment.
Figure 13B:
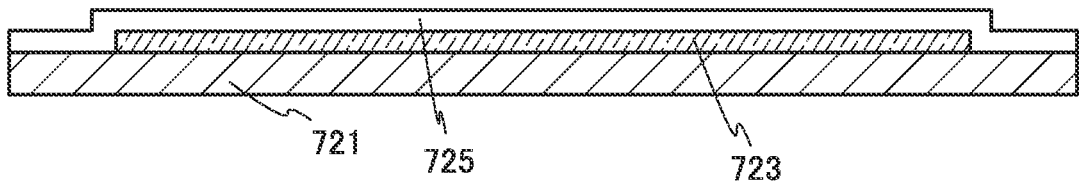

First, a separation layer 703 is formed over a formation substrate 701, and a layer 705 to be separated (hereinafter referred to as a layer 705) is formed over the separation layer 703 (FIG. 13A). In addition, a separation layer 723 is formed over a formation substrate 721, and a layer 725 to be separated (hereinafter referred to as a layer 725) is formed over the separation layer 723 (FIG. 13B).

For example, when a tungsten film is used as the separation layer, a tungsten oxide film can be formed between the layer to be separated and the tungsten film by an oxidation method such as performing plasma treatment on the tungsten film with a gas containing oxygen such as $N_2O$, annealing the tungsten film in a gas atmosphere containing oxygen, or forming a tungsten film by sputtering or the like in a gas atmosphere containing oxygen.

At the time of a separating and transferring process of the tungsten oxide film, it is preferable that the tungsten oxide film include tungsten oxide with a composition in which the ratio of oxygen to tungsten is lower than 3. In the case where tungsten oxide is $W_nO_{(3n-1)}$ or $W_nO_{(3n-2)}$, which is a homologous series, shear is easily caused by heating because there is a crystal optical shear plane therein. Forming the tungsten oxide film by $N_2O$ plasma treatment enables separation of the layer to be separated from the substrate with a weak force.

Alternatively, the tungsten oxide film can be directly formed without forming the tungsten film. For example, only the tungsten oxide film may be formed as the separation layer by performing plasma treatment on a sufficiently thin tungsten film with a gas containing oxygen, annealing a sufficiently thin tungsten film in a gas atmosphere containing oxygen, or forming the oxide tungsten film by sputtering or the like in a gas atmosphere containing oxygen.

When the separation is caused at the interface between the tungsten film and the tungsten oxide film or within the tungsten oxide film, the tungsten oxide film is left on the side of the layer to be separated in some cases. The left tungsten oxide film might adversely affect the properties of a transistor. Thus, a step of removing the left tungsten oxide film is preferably performed after the step of separating the separation layer and the layer to be separated. Note that the above method for separation from the substrate does not necessarily require $N_2O$ plasma treatment, so that the step of removing the tungsten oxide film can also be omitted. In that case, the device can be fabricated more simply.

In one embodiment of the present invention, a tungsten film with a thickness of greater than or equal to 0.1 nm and less than 200 nm is formed over the substrate.

As the separation layer, a film containing molybdenum, titanium, vanadium, tantalum, silicon, aluminum, or an alloy thereof can be used, besides a tungsten film. Furthermore, it is also possible to use a stack of such a film and its oxide film. The separation layer is not limited to an inorganic film, and an organic film such as polyimide may be used.

In the case of using an organic resin for the separation layer, a process temperature needs to be lower than or equal to 350° C. when low-temperature polysilicon is used as an active layer of a transistor. Thus, dehydrogenation baking for silicon crystallization, hydrogenation for termination of defects in silicon, or activation of a doped region cannot be performed sufficiently, so that the performance of the transistor is limited. On the other hand, in the case of using an inorganic film, the process temperature is not limited to 350° C., and excellent characteristics of a transistor can be obtained.

In the case of using the organic resin for the separation layer, the organic resin or a functional element is damaged in some cases by laser irradiation at the time of crystallization; thus, it is preferable to use an inorganic film for the separation layer because such a problem is not caused.

Furthermore, in the case of using the organic resin for the separation layer, the organic resin shrinks by laser irradiation for separating the resin and contact failure is caused in the contact portion of the terminal of an FPC or the like, which makes it difficult for functional elements with many terminals in a high-definition display, or the like to be separated and transferred with high yield. In the case of using an inorganic film for the separation layer, there is no such limitation, and functional elements with many terminals of a high-definition display or the like can be separated and transferred with high yield.

In the method for separating a functional element from a substrate of one embodiment of the present invention, an insulating layer and a transistor can be formed over a formation substrate at a temperature of lower than or equal to 600° C. In that case, high-temperature polysilicon can be used for a semiconductor layer. With use of a conventional production line for high-temperature polysilicon, a semiconductor device with a high operation speed, a high gas barrier property, and high reliability can be mass-produced. In that case, with use of the insulating layer and the transistor formed through a process at 600° C. or lower, insulating layers having an excellent gas barrier property formed at a temperature of lower than or equal to 600° C. can be provided above and below an organic EL element. Accordingly, entry of impurities such as moisture into the organic EL element or the semiconductor layer can be suppressed, whereby an extraordinarily reliable light-emitting device can be obtained as compared with the case of using the organic resin or the like as the separation layer.

Alternatively, the insulating layer and the transistor can be formed over the formation substrate at 500° C. or lower. In that case, low-temperature polysilicon or an oxide semiconductor can be used for the semiconductor layer, and mass production is possible with use of a conventional production line for low-temperature polysilicon. Also in that case, with use of the insulating layer and the transistor formed through the process at 500° C. or lower, insulating layers having an excellent gas barrier property formed at 500° C. or lower can be provided above and below the organic EL element. Accordingly, the entry of impurities such as moisture into the organic EL element or the semiconductor layer is suppressed, whereby a highly reliable light-emitting device can be obtained as compared with the case of using the organic resin as the separation layer.

Alternatively, the insulating layer and the transistor can be formed over the formation substrate at 400° C. or lower. In that case, amorphous silicon or an oxide semiconductor can be used for the semiconductor layer, and mass production is possible with use of a conventional production line for amorphous silicon. Also in that case, with use of the insulating layer and the transistor formed through the process at 400° C. or lower, insulating layers having an excellent gas barrier property formed at 400° C. or lower can be provided above and below the organic EL element. Accordingly, the entry of impurities such as moisture into the organic EL element or the semiconductor layer can be suppressed, whereby a reliable light-emitting device can be obtained as compared with the case of using the organic resin or the like as the separation layer.

Figure 13C:
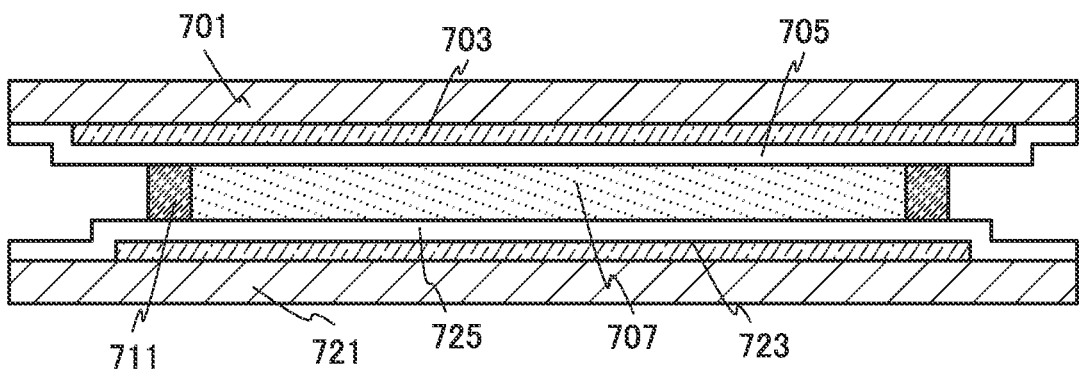

Next, the formation substrate 701 and the formation substrate 721 are attached to each other by using a bonding layer 707 and a frame-like bonding layer 711 so that the surfaces over which the layers to be separated are formed face each other, and then, the bonding layer 707 and the frame-like bonding layer 711 are cured (FIG. 13C). Here, the frame-like bonding layer 711 and the bonding layer 707 in a region surrounded by the frame-like bonding layer 711 are provided over the layer 725 and after that, the formation substrate 701 and the formation substrate 721 face each other and are attached to each other.

Note that the formation substrate 701 and the formation substrate 721 are preferably attached to each other in a reduced-pressure atmosphere.

Figure 13D:
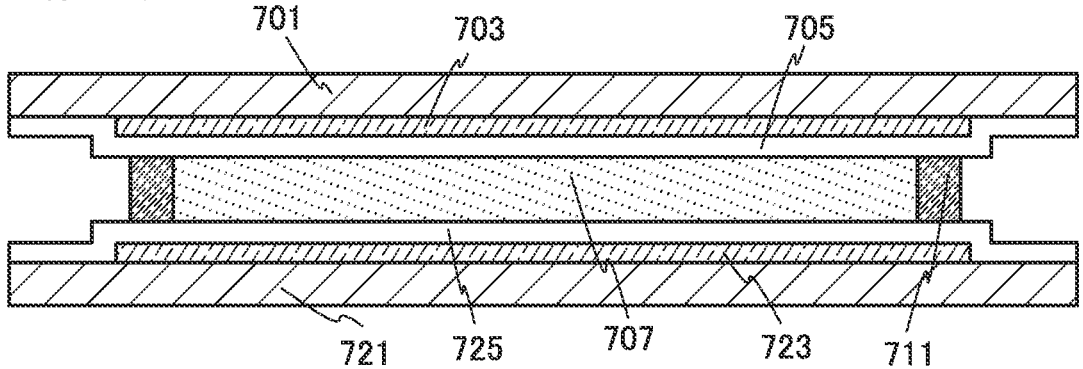

Note that although FIG. 13C illustrates the case where the separation layer 703 and the separation layer 723 are different in size, separation layers having the same size as illustrated in FIG. 13D may be used.

The bonding layer 707 is provided to overlap with the separation layer 703, the layer 705, the layer 725, and the separation layer 723. Then, edges of the bonding layer 707 are preferably positioned inside an area between at least edges of either the separation layer 703 or the separation layer 723 (the separation layer which is desirably separated from the substrate first). Accordingly, strong adhesion between the formation substrate 701 and the formation substrate 721 can be suppressed; thus, a decrease in yield of a subsequent separating process can be suppressed.

Figure 14A:
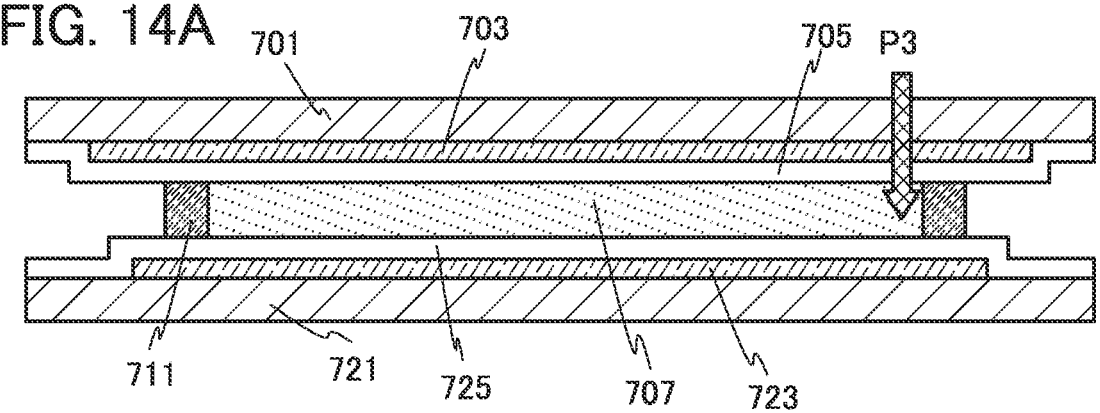
FIGS. 14A to 14D illustrate a method for manufacturing a bendable or foldable device of an embodiment.
Figure 14B:
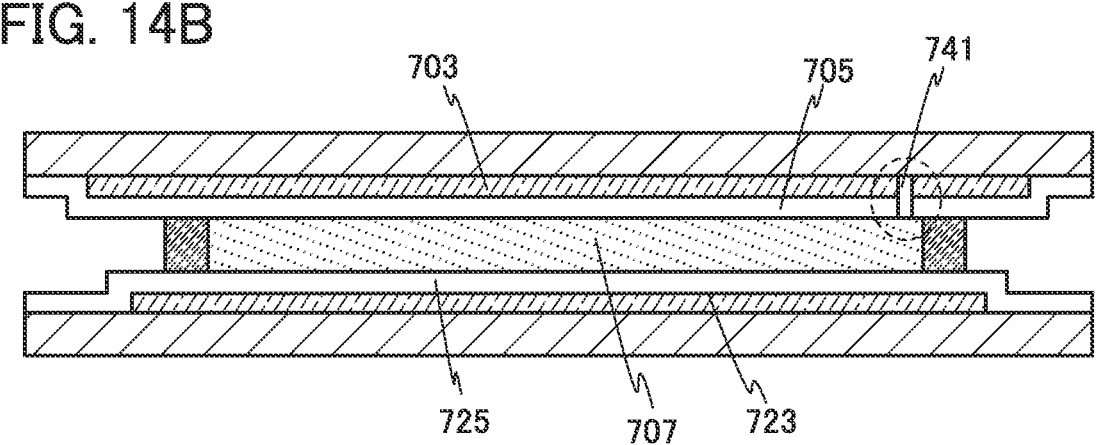

Next, a first trigger 741 for separation from the substrate is formed by laser irradiation (FIGS. 14A and 14B).

Either the formation substrate 701 or the formation substrate 721 may be separated first. In the case where the separation layers differ in size, a substrate over which a larger separation layer is formed may be separated first or a substrate over which a smaller separation layer is formed may be separated first. In the case where an element such as a semiconductor element, a light-emitting element, or a display element is formed over only one of the substrates, the substrate on the side where the element is formed may be separated first or the other substrate may be separated first. Here, an example in which the formation substrate 701 is separated first is described.

A region where the bonding layer 707 in a cured state or the frame-like bonding layer 711 in a cured state, the layer 705, and the separation layer 703 overlap with one another is irradiated with laser light. Here, the bonding layer 707 is in a cured state and the frame-like bonding layer 711 is not in a cured state, and the bonding layer 707 in a cured state is irradiated with laser light (see an arrow P3 in FIG. 14A).

Part of the layer 705 is removed; thus, the first trigger 741 for separation from the substrate can be formed (see a region surrounded by a dashed line in FIG. 14B). At this time, not only the layer 705 but also the separation layer 703, the bonding layer 707, or another layer included in the layer 705 may be partly removed.

It is preferred that laser light irradiation be performed from the side of the substrate provided with the separation layer that is desirably separated. In the case where a region where the separation layer 703 and the separation layer 723 overlap with each other is irradiated with laser light, the formation substrate 701 and the separation layer 703 can be selectively separated by cracking only the layer 705 of the layers 705 and 725 (see the region surrounded by the dotted line in FIG. 14B).

When a trigger for separation from the substrate is formed in both the layer 705 on the separation layer 703 side and the layer 725 on the separation layer 723 side in the case where the region where the separation layer 703 and the separation layer 723 overlap with each other is irradiated with laser light, it might be difficult to selectively separate one of the formation substrates. Therefore, laser light irradiation conditions are restricted so that only one of the layers to be separated is cracked, in some cases. The method for forming the first trigger 741 for separation from the substrate is not limited to laser light irradiation, and the first trigger 741 may be formed by a sharp knife such as a cutter.

Figure 14C:
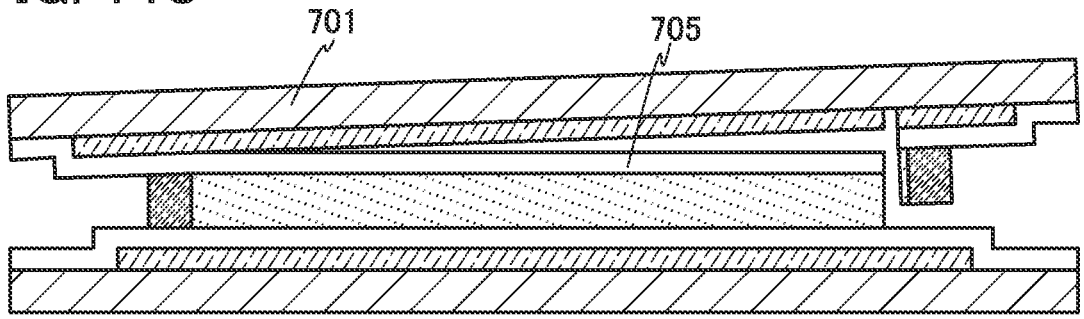
Figure 14D:
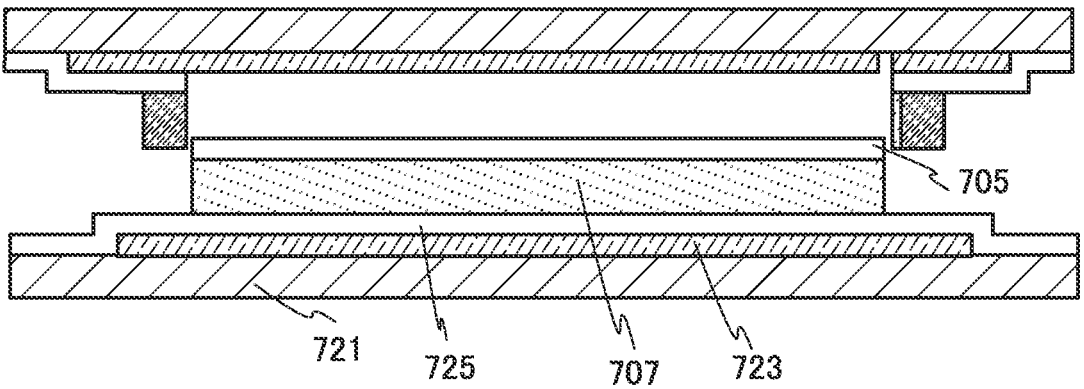

Then, the layer 705 and the formation substrate 701 are separated from each other from the first trigger 741 for separation from the substrate (FIGS. 14C and 14D). Consequently, the layer 705 can be transferred from the formation substrate 701 to the formation substrate 721.

Figure 15A:
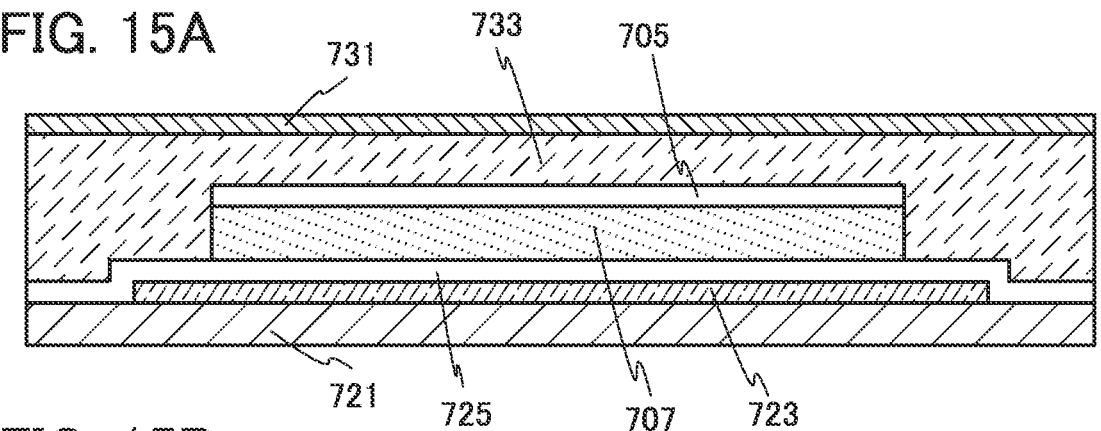
FIGS. 15A to 15D illustrate a method for manufacturing a bendable or foldable device of an embodiment.

The layer 705 that is separated from the formation substrate 701 in the step in FIG. 14D is attached to a substrate 731 with a bonding layer 733, and the bonding layer 733 is cured (FIG. 15A).

Figure 15B:
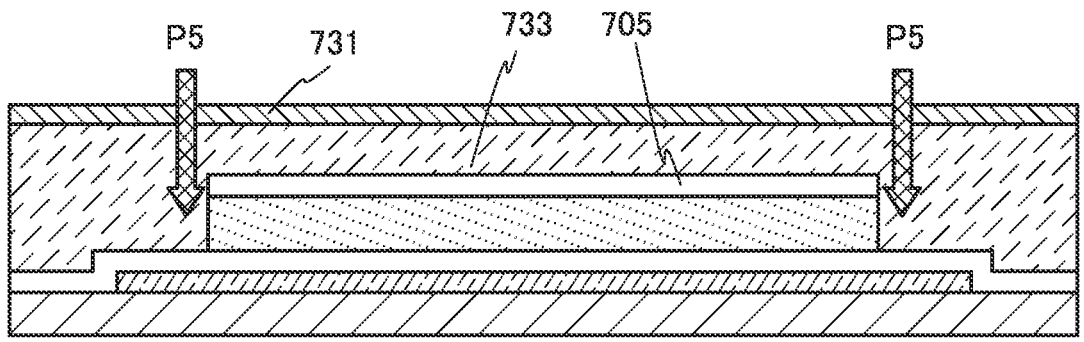
Figure 15C:
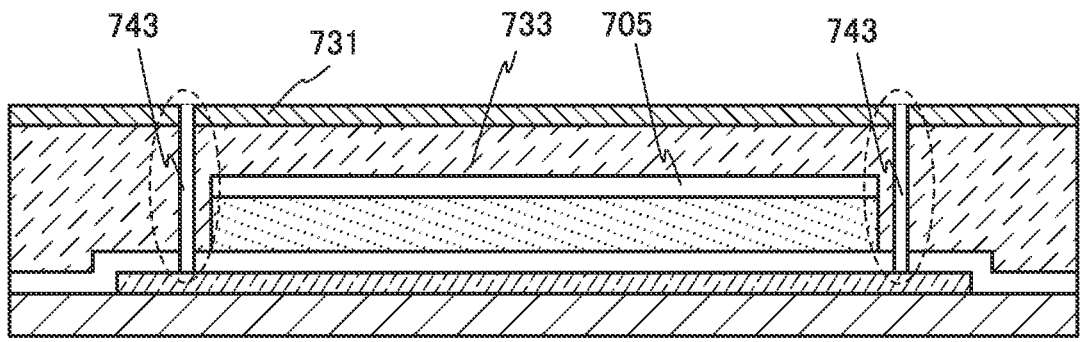
Figure 15D:
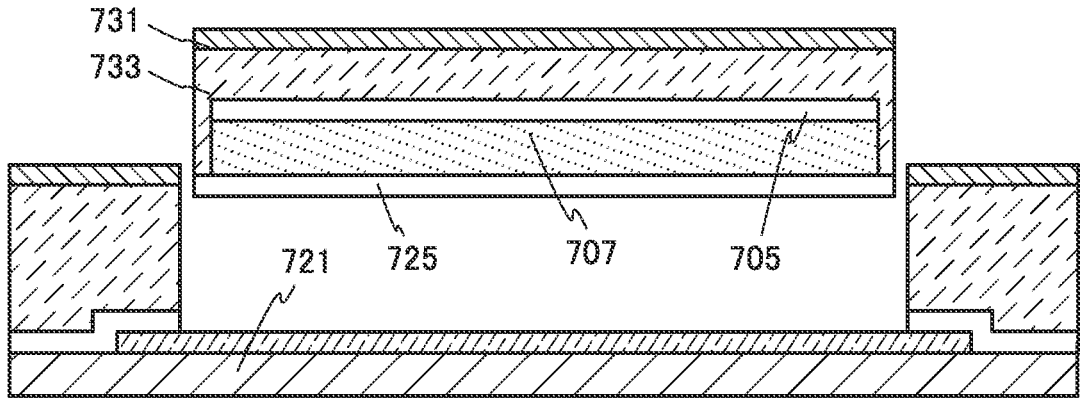

Next, a second trigger 743 for separation from the substrate is formed by a sharp knife such as a cutter (FIGS. 15B and 15C). The method for forming the second trigger 743 for separation from the substrate is not limited to a sharp knife such as a cutter, and the second trigger 743 may be formed by laser light irradiation or the like.

In the case where the substrate 731 on the side where the separation layer 723 is not provided can be cut by a knife or the like, a cut may be made in the substrate 731, the bonding layer 733, and the layer 725 (see arrows P5 in FIG. 15B). Consequently, part of the layer 725 can be removed; thus, the second trigger 743 for separation from the substrate can be formed (see a region surrounded by a dashed line in FIG. 15C).

In the case where there is a region in which the formation substrate 721 and the substrate 731 are attached to each other using the bonding layer 733 without overlapping with the separation layer 723 as illustrated in FIGS. 15B and 15C, yield of a subsequent process of separation from the substrate might be decreased depending on the degree of adhesion between the formation substrate 721 and the substrate 731. Therefore, a cut is preferably made in a frame shape in a region where the bonding layer 733 in a cured state and the separation layer 723 overlap with each other to form the second trigger 743 for separation from the substrate in the form of a solid line. This can improve the yield of the process of separation from the substrate.

Then, the layer 725 and the formation substrate 721 are separated from each other from the second trigger 743 for separation from the substrate (FIG. 15D), so that the layer 725 can be transferred from the formation substrate 721 to the substrate 731.

For example, in the case where the tungsten oxide film, which is tightly anchored by $N_2O$ plasma or the like is formed on an inorganic film such as a tungsten film, adhesion can be relatively high in deposition. After that, when a separation trigger is formed, cleavage occurs therefrom, whereby a layer to be separated can be easily separated from a formation substrate and transferred to another substrate.

The formation substrate 721 and the layer 725 may be separated from each other by filling the interface between the separation layer 723 and the layer 725 with a liquid such as water. A portion between the separation layer 723 and the layer 725 absorbs a liquid through a capillarity action. Accordingly, an adverse effect on the functional element such as an FET included in the layer 725 due to static electricity caused at the time of separation from the substrate (e.g., a phenomenon in which a semiconductor element is damaged by static electricity) can be suppressed.

When a bond of M-O—W (M represents a given element) is divided by application of physical force, a liquid is absorbed into the gap, whereby the bond becomes bonds of M-OH HO—W with a longer bond distance and the separation is promoted.

Note that a liquid may be sprayed in an atomized form or in a vaporized form. Examples of liquids include pure water, an organic solvent, a neutral, alkali, or acid aqueous solution, and an aqueous solution in which a salt is dissolved.

The temperature of the liquid and the substrate at the time of dynamic separation is set in the range from room temperature to 120° C., and preferably set to 60° C. to 90° C.

In the method for separation from a substrate in one embodiment of the present invention described above, separation of the formation substrate is performed in such a manner that the second trigger 743 for separation from the substrate is formed by a sharp knife or the like so that the separation layer and the layer to be separated are made in a separable state. This can improve the yield of the process of separation from the substrate.

In addition, bonding of a substrate with which a device is to be formed can be performed after the following procedure: a pair of formation substrates each provided with a layer to be separated are attached to each other and the formation substrates are individually separated. Therefore, formation substrates having low flexibility can be attached to each other when the layers to be separated are attached to each other, whereby alignment accuracy at the time of attachment can be improved compared with the case where flexible substrates are attached to each other.

In the method for separation from a substrate in one embodiment of the present invention, a layer to be separated over an oxide layer includes a first layer and a second layer from which hydrogen is released by heat treatment. In addition, $WO_3$ in the oxide layer can be reduced by hydrogen released by heat treatment from the layer to be separated, so that the oxide layer can have a high $WO_2$ content. Consequently, separation from a substrate can be facilitated.

This embodiment can be implemented in appropriate combinations with any of the other embodiments and examples described in this specification.

This application is based on Japanese Patent Application serial no. 2013-249677 filed with Japan Patent Office on Dec. 2, 2013, the entire contents of which are hereby incorporated by reference.

What is claimed is:

1. A display device comprising:
   a display panel; and
   a first housing, a second housing, and a third housing,
   wherein, when the display device is folded, a display surface of the display panel faces inward,
   wherein the display panel comprises:
      a first region overlapping with the first housing;
      a second region overlapping with the second housing;
      a third region between the first region and the second region;
      a fourth region overlapping with the first region and positioned on a back surface side of the first region; and
      a fifth region between the first region and the fourth region and having a region not overlapping with the third housing,
   wherein, when the display device is folded, each of the third region and the fifth region has a curved region,
   wherein, when the display device is not folded, the fifth region has a curved region,
   wherein, when the display device is not folded, the third housing has a region overlapping with each of the first region, the second region, and the third region, and
   wherein the third housing is positioned between the first region and the fourth region.

2. The display device according to claim 1, wherein the fourth region has a terminal portion.

3. The display device according to claim 1, wherein, when the display device is folded, a center of curvature of the third region is positioned on a display surface side of the display device.

4. The display device according to claim 1, wherein, when the display device is folded, a center of curvature of the fifth region is positioned on a back surface of a display surface side of the display device.

* * * * *